(12) United States Patent
Patelski, III

(10) Patent No.: US 11,485,093 B2
(45) Date of Patent: Nov. 1, 2022

(54) ADHESIVE-BACKED SUBSTRATE FILM AND METHODS OF TRACING AND APPLYING FILM

(71) Applicant: Kazimir Patelski, III, Costa Mesa, CA (US)

(72) Inventor: Kazimir Patelski, III, Costa Mesa, CA (US)

( * ) Notice: Subject to any disclaimer, the term of this patent is extended or adjusted under 35 U.S.C. 154(b) by 88 days.

(21) Appl. No.: 16/695,633

(22) Filed: Nov. 26, 2019

(65) Prior Publication Data
US 2021/0154945 A1    May 27, 2021

(51) Int. Cl.

| | | |
|---|---|---|
| *B29C 65/00* | (2006.01) | |
| *B29C 65/78* | (2006.01) | |
| *B29C 65/48* | (2006.01) | |
| *G06T 3/40* | (2006.01) | |
| *G06T 11/20* | (2006.01) | |
| *B63B 32/57* | (2020.01) | |
| *B32B 37/26* | (2006.01) | |
| *B32B 37/00* | (2006.01) | |
| *B32B 43/00* | (2006.01) | |

(52) U.S. Cl.
CPC ...... *B29C 65/7817* (2013.01); *B29C 65/4805* (2013.01); *B29C 66/02241* (2013.01); *B63B 32/57* (2020.02); *G06T 3/40* (2013.01); *G06T 11/203* (2013.01); *B29C 66/45* (2013.01); *B32B 37/0038* (2013.01); *B32B 37/025* (2013.01); *B32B 43/006* (2013.01); *B32B 2037/268* (2013.01); *B63B 2221/10* (2013.01)

(58) Field of Classification Search
CPC ... B32B 38/10; B32B 43/006; B32B 37/0038; B32B 37/025; B32B 2037/268; B29C 66/45
See application file for complete search history.

(56) References Cited

U.S. PATENT DOCUMENTS

2008/0020166 A1\* 1/2008 Esposito ................ A63C 5/003
428/41.7

\* cited by examiner

*Primary Examiner* — Philip C Tucker
*Assistant Examiner* — Nickolas R Harm
(74) *Attorney, Agent, or Firm* — Cionca IP Law P.C.; Marin Cionca

(57) ABSTRACT

Methods of tracing a lengthwise half of a board sports board and applying a substrate film cutout onto the board having the steps of centering a centerline of a tracing scale onto a center of the board, the tracing scale having an off-centerline on both sides of the centerline; aligning a centerline mark of the film with the off-centerline of the tracing scale; flipping the board over such that the board is on top of the film; tracing a trace outline of half of the board onto the film, such that the half of the trace outline is incrementally larger or smaller than the half of the board; removing a release liner from the trace outline to expose an adhesive in the film; wetting the adhesive with a solution of water and liquid soap; flattening the wetted film onto the board with a spreader; and wiping with a wiping cloth.

7 Claims, 26 Drawing Sheets

ADHESIVE-BACKED SUBSTRATE FILM AND METHODS OF TRACING AND APPLYING FILM

BACKGROUND OF INVENTION

1. Field of the Invention

The invention relates generally to board sports boards and more specifically to traction solutions for board sports boards and methods for tracing and applying such traction solutions onto board sports board.

2. Description of the Related Art

Currently, methods of providing traction on board sports board such as surfboards, paddle boards, wake boards, and the like involve applying wax, foam pads, or traction stickers onto the surface of the board. Wax, though widely available and relatively inexpensive, melts when exposed to higher temperatures, requires constant reapplication, and as the wax wears off the board, the wax sinks in the water, thereby polluting the water environment. Furthermore, this repeated wax reapplication usually occurs before each outing and may therefore be time-consuming.

Foam pads, which are more modern alternatives to wax, can be heavy and may absorb water, which affect board performance. Additionally, foam pads are bulky in nature and non-transparent, and therefore may cover up board aesthetics like graphics, stripes, and stickers. Traction stickers or tiles, which are applied sectionally onto the board, are transparent but are unable to cover the entire board surface and therefore may not provide the desired levels of traction for the user. Additionally, traction tiles have multiple edges on the sides of each tile. These multiple edges can result in a rough feel to the skin and provide multiple snag edges on each tile that reduce the adhesion and comfort of the tile in general.

Therefore, there is a need to solve the problems described above by providing a high-performance, water-reactive, soft-traction, transparent substrate film for a board sports board and methods for efficiently tracing a specific shape onto the film and easily applying the film onto the board sports board.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a pressure-sensitive, adhesive-backed substrate film is provided that allows for a board sports board traction solution that has an embossed design, gripping texture, sufficient thickness, transparent and non-yellowing UV-resistant properties, light weight, and finished shape. An advantage of the embossed design of the adhesive-backed substrate film may be the film's soft traction and non-abrasive hand feel. Another advantage of the embossed design may be the film's water-activated gripping texture, which provides much better grip and traction when the board is wet (during its intended use), and less grip and traction when the board is dry (during non-use). An advantage of the adhesive-backed film's thickness and light weight may be the ease of manual installation on the surface of the board and complex curvature lamination. An advantage of the transparent and non-yellowing UV-resistant properties may be that board color, graphics, stickers and board material such as wood grain, may remain clearly visible after application and repeated use of the board. An advantage of the adhesive-backed substrate film's finished shape may be that the film may match the outline of the board sports board, which may allow the film to provide traction for the entire surface of the board.

In another aspect, a pressure-sensitive, adhesive-backed substrate film is provided with a transparent plastic release liner that may be scored with peel strips, which may be of any number, width dimension, length dimension and location. An advantage of the transparent release liner design may be that the substrate film is installed onto the surface of the board sports board with visual ease. An advantage of the peel strips of the release liner may be the ease of handling the substrate film, allowing for correct placement and securement of the substrate film manually onto the board, before securing the main or larger portions of the adhesive-backed substrate film.

In another aspect, a method of tracing a board sports board shape onto an adhesive-backed substrate film is provided. An advantage of the method of tracing may be that the exact size and/or any reduced or enlarged scale of the board shape may be efficiently outlined and cut out for application onto the board sports board. The method of tracing a board sports board shape may be provided with a tracing scale, which allows the traced outline to be incrementally larger or smaller than the exact outline dimensions of the board. An advantage of the tracing scale may be the ease and accuracy with which any reduced or enlarged outline dimensions of a board sports board is traced and/or further duplicated. An alternative method of tracing a board sports board may allow an exact size and/or any reduced or enlarged scale of the board shape to be accurately outlined in a software application and cut out with a digital cutter.

In another aspect, a method of applying a pressure-sensitive, adhesive-backed substrate film onto a board sports board is provided. The method of applying the adhesive-backed substrate film may be provided with an atomizing spray bottle, which enables the wetted substrate film to be easily positioned, lifted and adjusted/re-positioned correctly during installation. The method of applying the substrate film may also be provided with a spreader or squeegee, which removes any excess water and air bubbles between the adhesive-backed substrate film and the board surface. An advantage of the method of applying the adhesive-backed substrate film may be the ease with which the film is applied onto the board sports board. Another advantage may be that the method enables the installation of any size, width or length of adhesive-backed substrate film onto any flat, semi-flat or semi-complex curved surface that would require traction. A further advantage of the method of applying the adhesive-backed substrate film may be the accommodation of stickers and decals, such that the stickers and decals are preserved and protected beneath the substrate film layer during use of the board sports board.

In another aspect, a method of applying a pressure-sensitive, adhesive-backed substrate film grip onto a board sports board is provided. The method of applying the adhesive-backed substrate film grip may be provided with an atomizing spray bottle, which enables the wetted substrate film to be easily positioned, lifted and adjusted/re-positioned correctly during installation. The method of applying the substrate film grip may also be provided with a spreader or squeegee, which removes any excess water and air bubbles between the adhesive-backed substrate film grip and the board surface. An advantage of the method of applying the adhesive-backed substrate film grip may be the ease with which the film grip is applied onto the board sports board. Another advantage may be that the method enables the lamination of any size, width or length of adhesive-backed substrate film grip onto any flat, semi-flat or semi-complex curved surface that would require traction. A further advantage of the method of applying the adhesive-backed substrate film grip may be the accommodation of stickers and decals, such that the stickers and decals remain clearly visible beneath the substrate film grip during use of the board sports board.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1A:
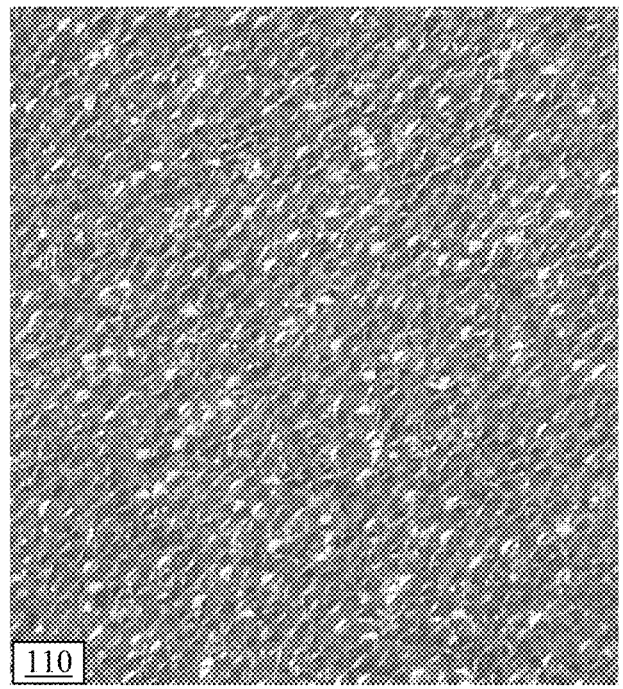
FIGS. 1A-1B illustrate enlarged front views of the surface of an adhesive-backed substrate film with an embossed design, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 100 and 210, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
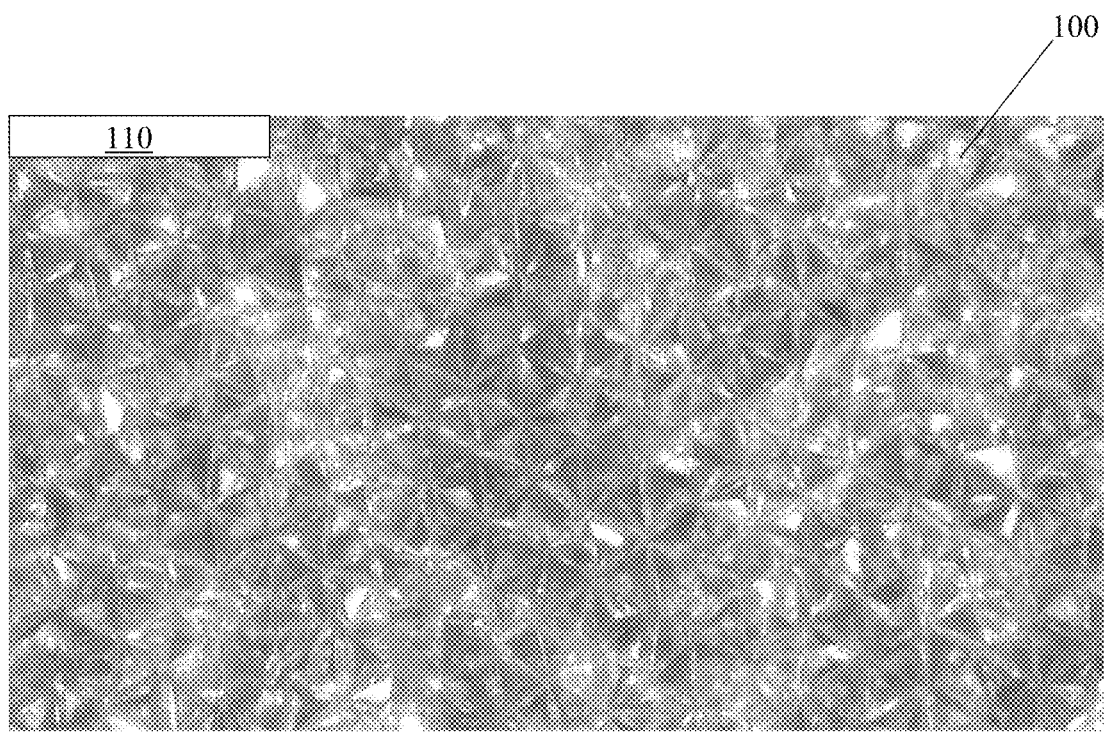

FIGS. 1A-1B illustrate enlarged front views of the surface of an adhesive-backed substrate film 110 with an embossed design 100, according to an aspect. The adhesive-backed substrate film ("adhesive-backed substrate film," "substrate film," "film") 110 may be provided with an embossed design, as shown in FIGS. 1A-1B. The implementation of the embossed design results in a raised pattern 100 in the surface of the substrate film 110, as shown. The embossed pattern 100 may provide a gripping, non-tacky texture on the surface of the substrate film 110 and may therefore provide traction for a board sports board. An advantage of the embossed design of the substrate film 110 may be the non-abrasive hand feel of the film during board use. An advantage of the non-tacky texture of the substrate film's surface may be the reduction in any dirt or debris that may stick to the film's surface. The substrate film may be provided with a sufficient thickness (0.28-5 mm) to allow ease of manual lamination and the adherence of the film to surfaces of varying complexity and curvature.

The adhesive-backed substrate film 110 may also be provided with a suitable polymer substrate that allows the film to be a high-performance, transparent and lightweight traction solution. The provided polymer substrate may allow the substrate film 110 to be transparent and possess non-yellowing UV-resistant properties. An advantage of the film's transparency and non-coloration over time may be that board graphics (e.g., colors, wood grain, stickers, stripes, labels, etc.) may remain visible after application of the film and during board use. The suitable polymer substrate may also allow the substrate film 110 to be lightweight, and more specifically, lighter than water. The light weight of the substrate film 110 may be particularly advantageous for board sports boards that are meant to support human weight on water (e.g., surfboards and paddle boards). The polymer substrate may also enable the substrate film 110 to possess a water-activated gripping texture, which provides the board with much better grip and traction when the board is wet, and less grip and traction when the board is dry. An advantage of this water-activated gripping texture may be that the film may possess a non-abrasive hand feel, while retaining its gripping traction, when the board is either wet or dry.

Figure 2A:
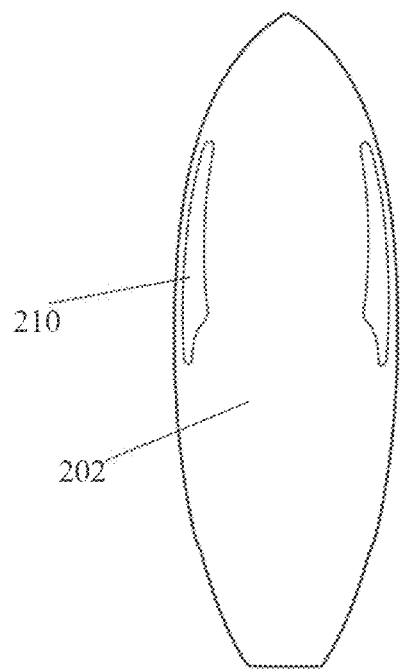
FIGS. 2A-2D show front elevation views of a board sports board with exemplary adhesive-backed substrate film grips, according to an aspect.
Figure 2B:
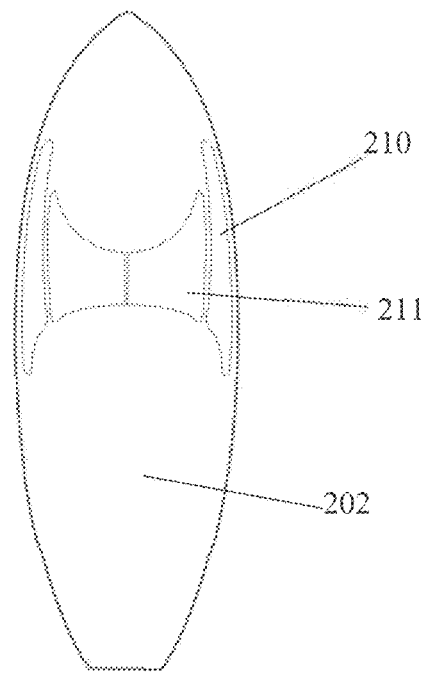
Figure 2C:
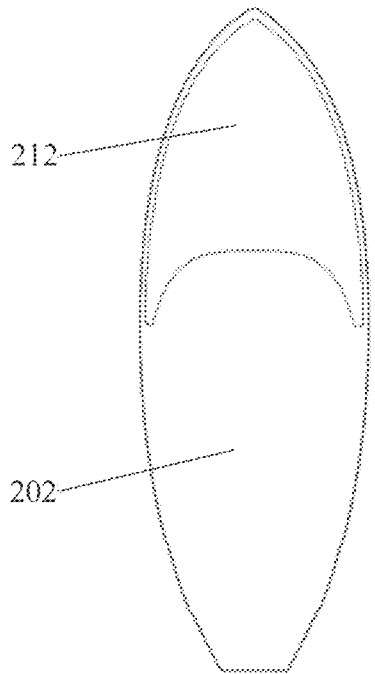
Figure 2D:
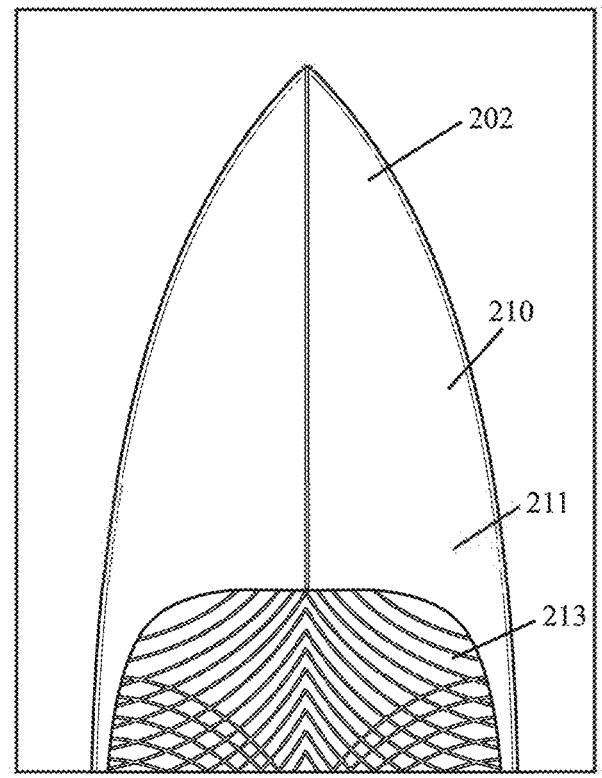

FIGS. 2A-2D show front elevation views of a board sports board 202 with exemplary adhesive-backed substrate film grips 210-212, according to an aspect. A board sports board may be provided with an adhesive-backed substrate film that may cover the entire surface of the board. Alternatively, a board sports board may be provided with adhesive-backed substrate film grips of various sizes and shapes, as shown in FIGS. 2A-2C. The specific sizes and shapes of the substrate film grips may be selected by the user, which may allow the grips 210-212 to be customizable for any size and/or type of board sports board 202. As shown in FIG. 2D, the availability of smaller, specifically shaped film grips 210 and 211 may allow for the accommodation of an already existing foam pad 213 on the surface of the board sports board 202, as an example.

The substrate film grips 210 may be precut to provide traction on the rails of a board sports board 202, as shown in FIG. 2A. Additionally, the substrate film grip 211 may be precut to also provide traction on the center of a board sports board 202, as shown in FIGS. 2B and 2D. As another example, the substrate film grip 212 may be precut to provide traction on the full top of a board sports board 202, as shown in FIG. 2C. It should be noted that the substrate film grips may comprise additional shapes and sizes not shown as examples in FIGS. 2A-2D.

Figure 3:
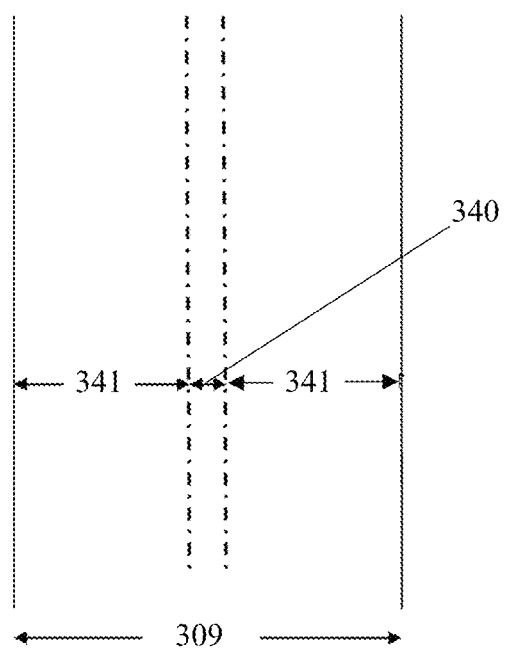
FIG. 3 illustrates a front elevation view of a release liner design, according to an aspect.

FIG. 3 illustrates a front elevation view of a release liner design, according to an aspect. The one-sided release liner design shown in FIG. 3 may comprise a release liner 309 with a center peel strip 340 and a pair of side peel strips 341. The release liner 309 may be transparent and may line the bottom side of the adhesive-backed substrate film (shown by 110 in FIG. 1). The release liner 309 may be made from a clear plastic film composition, which may bond with adhesive release properties in the liner 309 and provide enough thickness to allow each peel strip 340, 341 to be peeled away from the bottom surface of the substrate film adhesive. An advantage of the one-sided release liner design may be that the center peel strip 340 and pair of side peel strips 341 may be easily peeled away from the substrate film one by one, which exposes only certain areas of the substrate film at a time. The peel strips 340 and 341 may enable easy and efficient installation of the substrate film onto a board sports board, which will be discussed in further detail when referring to FIGS. 7A-7P.

The release liner design shown in FIG. 3 may also be provided with an adhesive layer (not shown) that lies between the release liner 309 and the surface of the substrate film. The adhesive layer may be made from a suitable adhesive that enables the substrate film to stick to the board while also retaining transparency and non-yellowing UV-resistant properties when dry, as an example. The adhesive provided with the one-sided release liner design shown in FIG. 3 may allow for efficient and semi-permanent installation of the substrate film on the board, which will be discussed more herein below.

The release liner design shown in FIG. 3 may be provided with peel strips, as mentioned above, that allow exposure of specific sections of the adhesive on the substrate film at a time. As an example, firstly removing the center peel strip 340 exposes only a central line of the adhesive on the substrate film, which may allow ease of center alignment and installation of the central line on the board sports board. Removing the larger side peel strips 341 exposes the larger side areas of the adhesive on the substrate film, which may allow ease of installation of these side areas on the board, as an example. The removing of the peel strips 340, 341 will be discussed in greater detail when referring to the exemplary steps shown in FIGS. 7A-7P below.

The peel strips 340, 341 shown in FIG. 3 may be provided with any widths and/or dimensions sufficient for lining the whole surface of a substrate film shape. The one-sided release liner 309 may be scored through into any width to form the peel strips 340, 341. As an example, the one-sided release liner 309 may be provided with a thickness of about 2-3 thousandths of an inch to give the liner enough thickness and bonding release to be easily peeled back by the user. The clear plastic one-sided liner 309 may then be laminated onto the bottom surface of the adhesive-backed substrate film sheet, which prepares the substrate film for installation.

Figure 4:
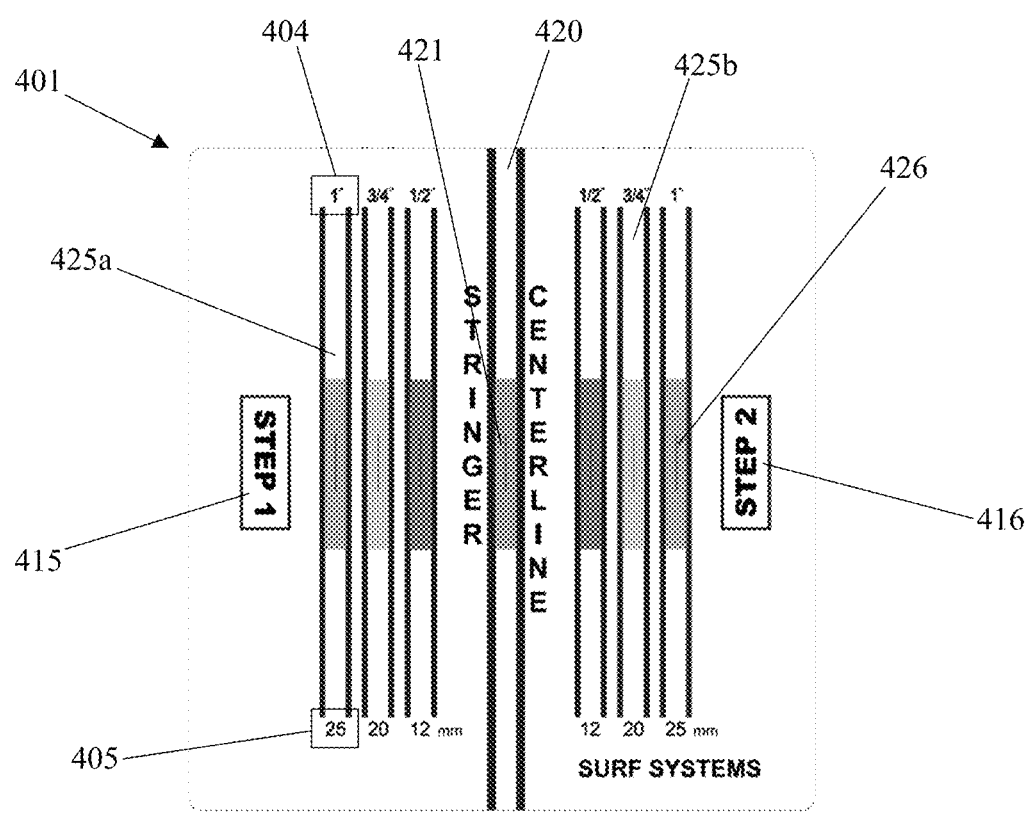
FIG. 4 illustrates a front elevation view of a tracing scale label, according to an aspect.

FIG. 4 illustrates a front elevation view of a tracing scale label 401, according to an aspect. As shown, the tracing scale label 401 may be provided with several exemplary features: centerline area 420, off-center zone 425, centerline 421, off centerline 426, step indicators 415 and 416, and distance markers 404 and 405. As will be discussed in further detail herein below, the tracing scale label 401 may assist in a method of tracing a board sports board shape onto the surface of a sheet of adhesive-backed substrate film.

As shown in FIG. 4, the tracing scale label 401 may be provided with center area 420 and off-center zone 425. The center area 420 and off-center zone 425 may be printed, etched or engraved on any material, as an example. The center area 420 may represent the central portion of the tracing label 401 and may be provided with a centerline 421. The centerline 421 can be represented as a mark, dot, line, shaded block, or parallel lines, as shown as an example. The off-center zone 425 may represent any portion of the tracing label 401 to the left (425a) and/or right (425b) side of the center area 420, as shown. The off-center zone 425 may be provided with an off centerline 426 that can also be represented as a mark, dot, line, shaded block, or parallel lines, as shown. As will be discussed in further detail herein below, the centerline 421 and off centerline 425 or 426 may assist in tracing an exact or slightly reduced or enlarged outline of a board sports board shape.

The tracing scale label 401 may be provided with distance markers 404 and 405, as shown. The distance markers 404 and 405 may represent specific distances from the centerline 421, as shown. As shown, the distance markers 404 and 405 may be provided along two scales, the scale along the top of the label 401 being in inches and the scale along the bottom being in millimeters, as an example. The distance markers 404 and 405 may correspond to off centerlines 426 within off-center zones 425 that are specific distances away from the centerline 421. As an example, the distance markers 404 and 405, which are 1 in and 25 mm away from the centerline 421, respectively, correspond to the second off-center zone 425b from the center area 420, as shown.

FIGS. 5A-5K show exemplary steps in an example of a tracing process using a tracing scale 501 for obtaining a trace outline of a board sports board shape, according to an aspect. As mentioned previously herein above, the tracing process shown in FIGS. 5A-5K allows for the tracing of a board shape onto the surface of substrate film in either an exact outline or any incrementally reduced or enlarged outline. The tracing scale 501 allows for the incremental outline size adjustments, as will be described in further detail herein below. It should be understood that the following exemplary steps of the tracing process are performed on a first half of the board sports board (i.e., half of the board lengthwise) and are then repeated for a second half of the board sports board.

Figure 5A:
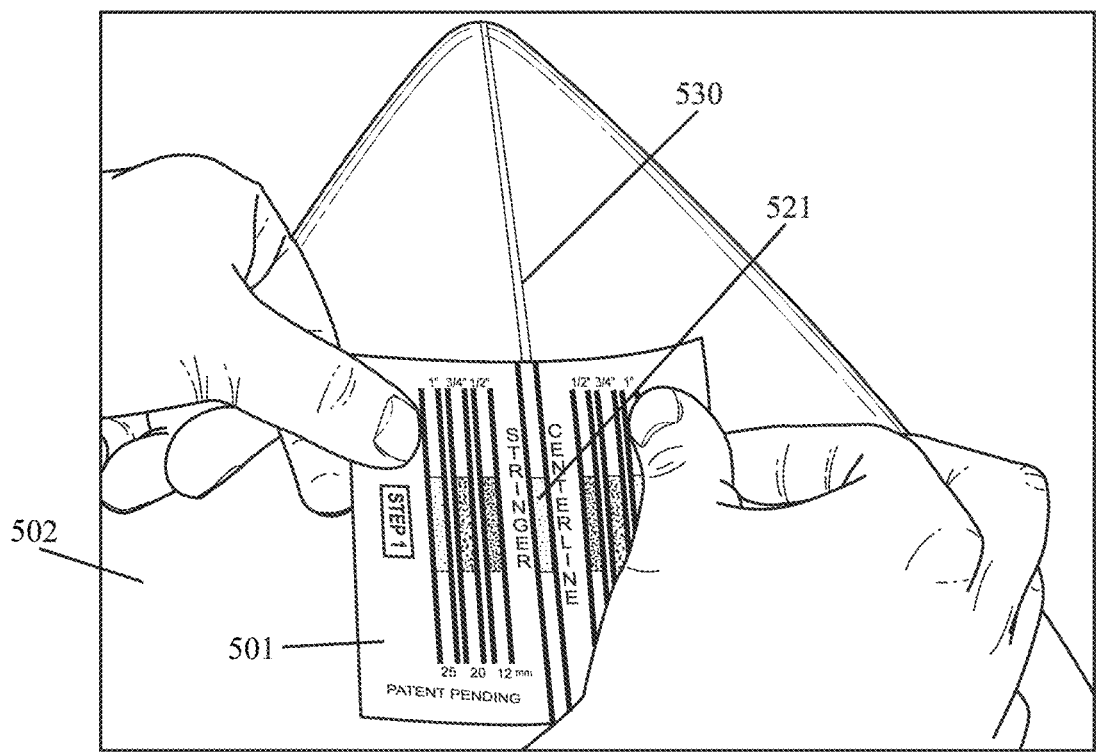
FIGS. 5A-5K show exemplary steps in an example of a tracing process using a tracing scale for obtaining a trace outline of a board sports board shape, according to an aspect.
Figure 5B:
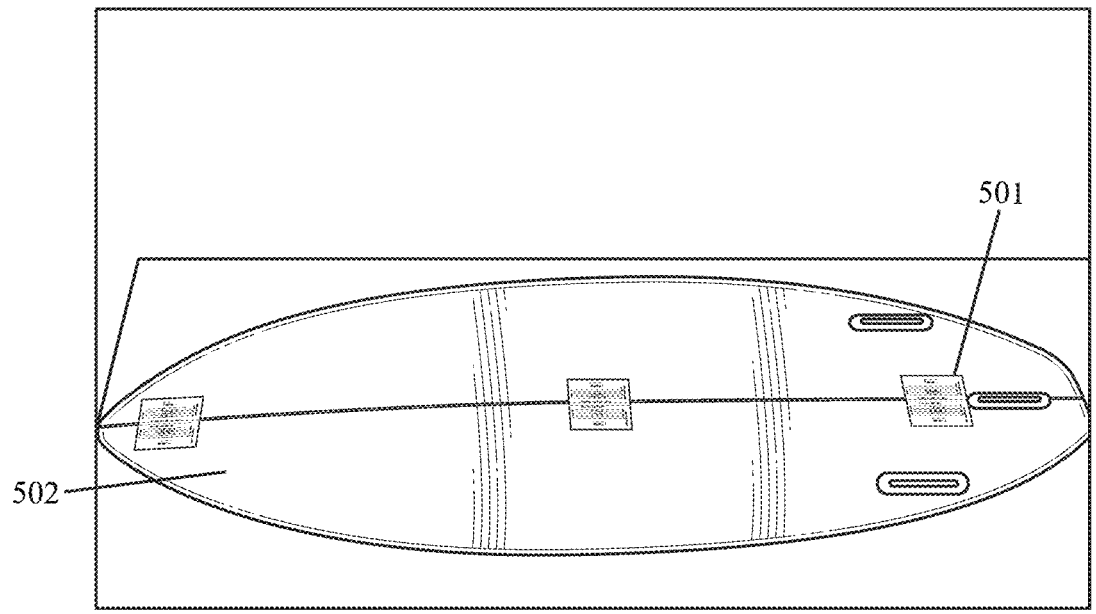

As shown as an example in FIG. 5A, the tracing scale label 501 may be a sticker placed onto the surface of a board sports board 502. To initiate the tracing process disclosed herein, the user may first place the tracing scale label 501 onto the board sports board 502, aligning the centerline 521 of the tracing scale label 501 with the stringer or center 530 of the surfboard 502, as an example. Per this example, the stringer is a preexisting stripe running down the center of a surfboard, as is known to one of ordinary skill in the art. As shown in FIG. 5A, the tracing scale label 501 should be placed on the board 502 such that the label is right-side-up at the top of the surfboard 502. As shown in FIG. 5B, additional tracing scale labels 501 may be placed in two or three places on the board 502 such that the label 501 is right-side-up at the middle and bottom of the surfboard 502 as well, as an example. The placement of two or three tracing scale labels 501 on the board 502, as shown in FIG. 5B, enables proper alignment of the whole substrate film on the board (as will be described in FIG. 5F).

Figure 5C:
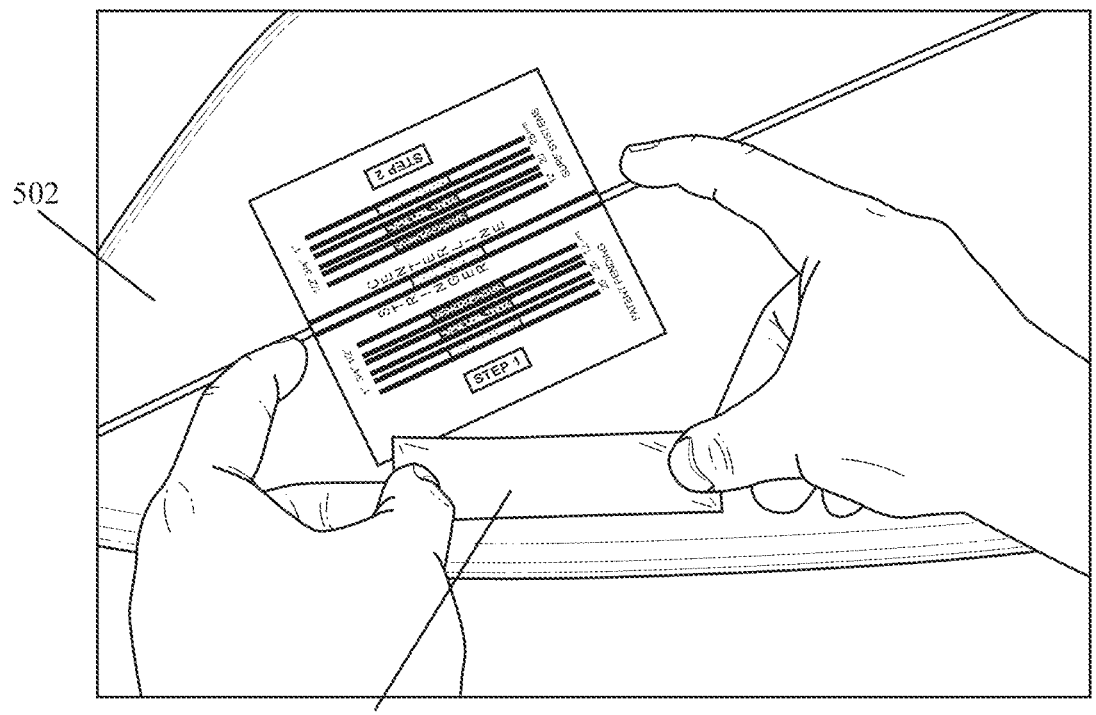
Figure 5D:
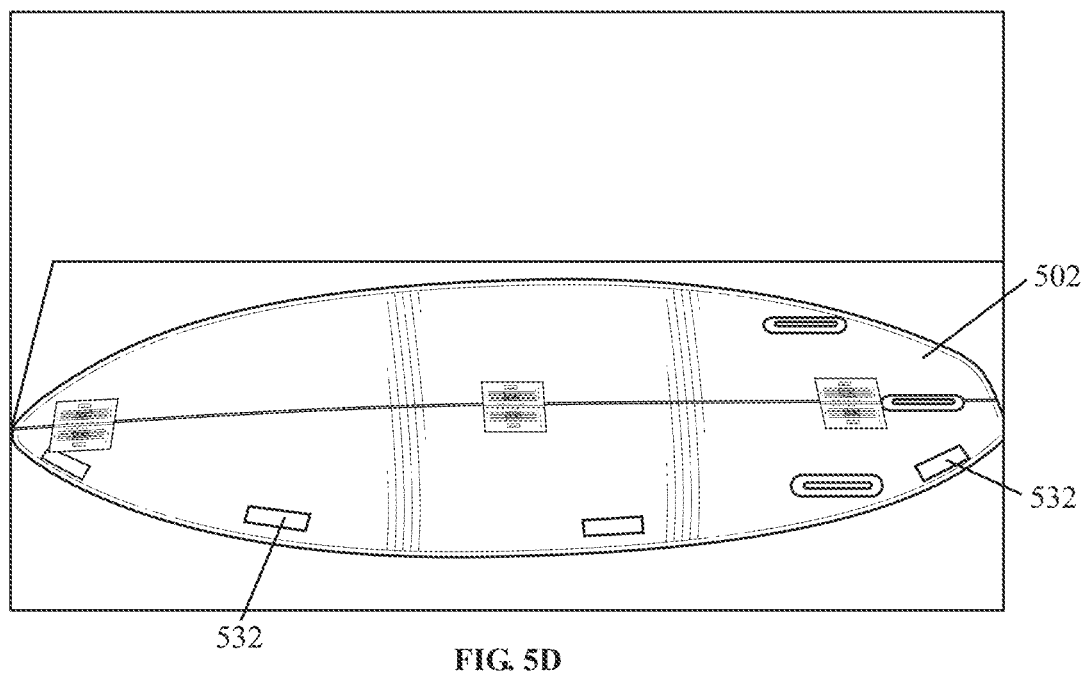

Next, the user may place adhesive elements 532 onto the surface of the board 502, as shown in FIG. 5C. The adhesive element 532 may be double-sided tape, rolled over tape, or any other off-the-shelf temporary adhesive element. The adhesive elements 532 may be placed at various points on the surface of the board 502, as shown in FIG. 5D, to temporarily secure the substrate film to the board for the purpose of efficiently tracing the shape of the board 502.

Figure 5E:
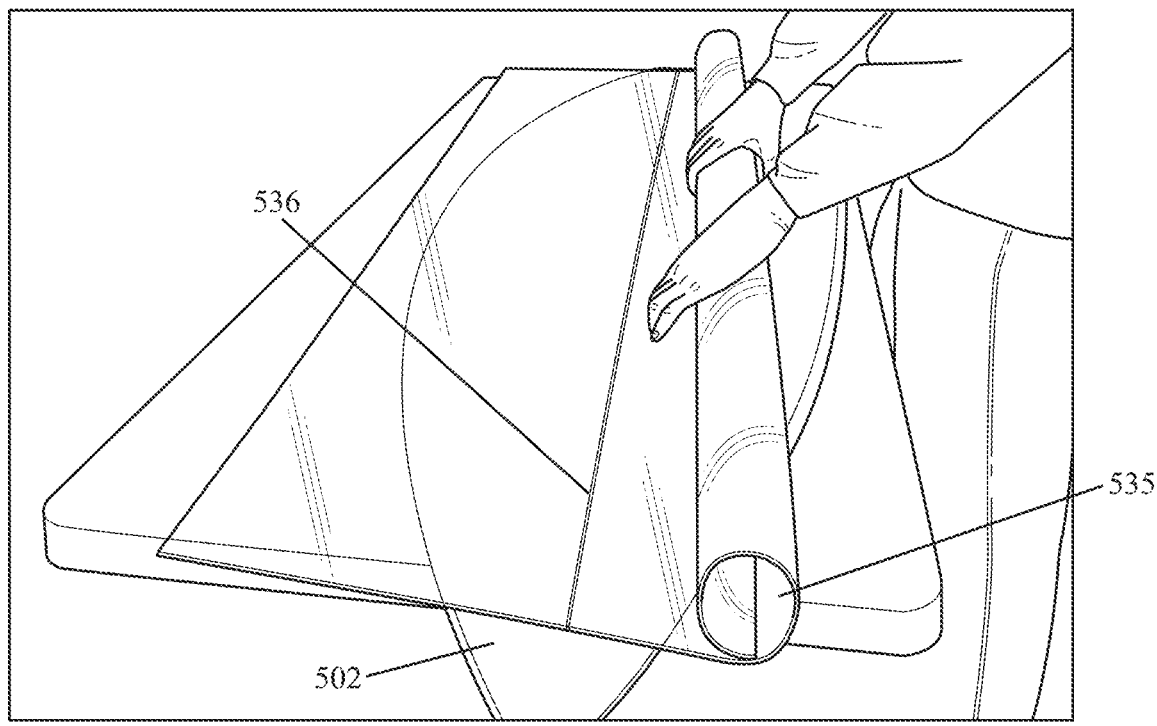
Figure 5F:
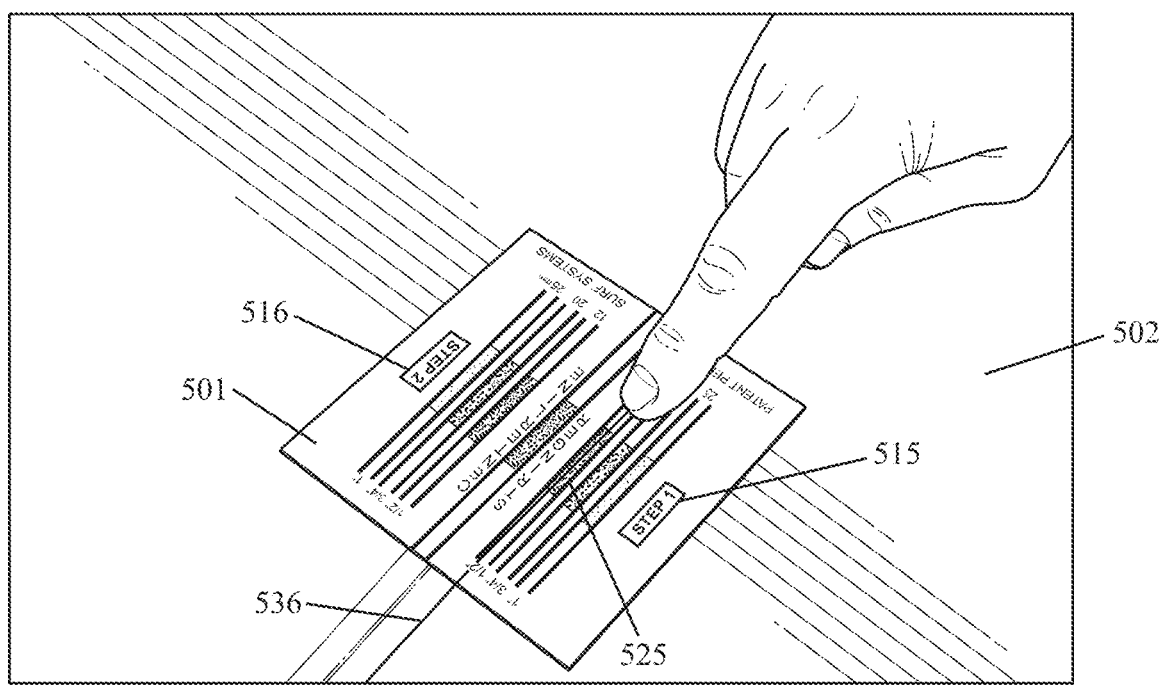

As shown in FIG. 5E, the user may then unroll a sheet of substrate film 535 over the board sports board 502, such that the grip side (containing the embossed design) is on the top and the one-sided release liner is on the bottom (making contact with the board). The sheet of substrate film 535 may be provided with a centerline mark 536 running down the center of the sheet 535. The centerline mark 536 may be manufactured on the sheet of substrate film 535 prior to the tracing process and may be made from water-erasable ink. An advantage of manufacturing the centerline mark 536 from water-erasable ink may be that the mark 536 may disappear after the application process disclosed herein below, allowing the substrate film 535 to be transparent after application onto a board sports board 502. As shown in FIG. 5F, the sheet of substrate film 535 may be aligned on the surface of the surfboard 502, such that the centerline mark 536 is placed within the user-specified off-center zone 525 starting with a first half of the board as indicated by the step indicator 515.

Figure 5G:
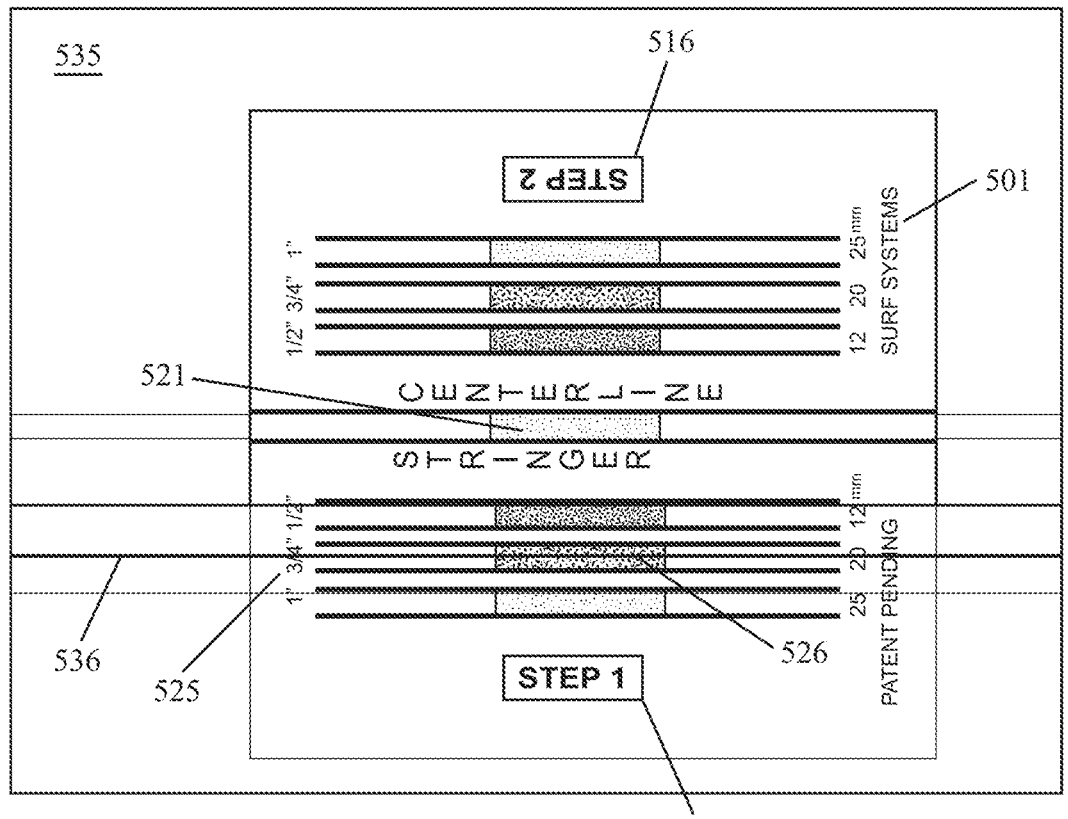

As an example, the user may decide to trace an outline of the surfboard shape that is incrementally smaller than the exact outline of the surfboard 502. As shown in FIG. 5G, the user may align the centerline mark 536 of the substrate film sheet 535 with the off centerline 526 on the side indicated by "STEP 1" (515) that is ¾ inches (525) away from the centerline 521, as an example. Once the centerline mark 536 is properly aligned with the chosen off centerline 525, the substrate film sheet 535 may be secured to the board 502 via the adhesive elements applied earlier (FIG. 5D). In this way, the chosen off centerline 526 essentially becomes the centerline of the trace outline that will be traced onto the substrate film sheet 535. Thus, when the user traces the first half of the board sports board, the resulting trace outline will be ¾ inches smaller than the exact outline of the surfboard, per the example. In other words, the distance between the centerline of the trace outline and an edge of the trace outline will be ¾ inches shorter than the distance between the actual center of the board and an actual edge of the board, as an example. Alternatively, the user may decide to trace an outline of the surfboard that is incrementally larger than the exact outline of the board. For such an example, the user may align the centerline mark 536 on the side of the trace label 501 indicated by "STEP 2" (516), such that the resulting trace outline may now be incrementally larger (i.e., ¾ inches larger) than the exact board profile.

Figure 5H:
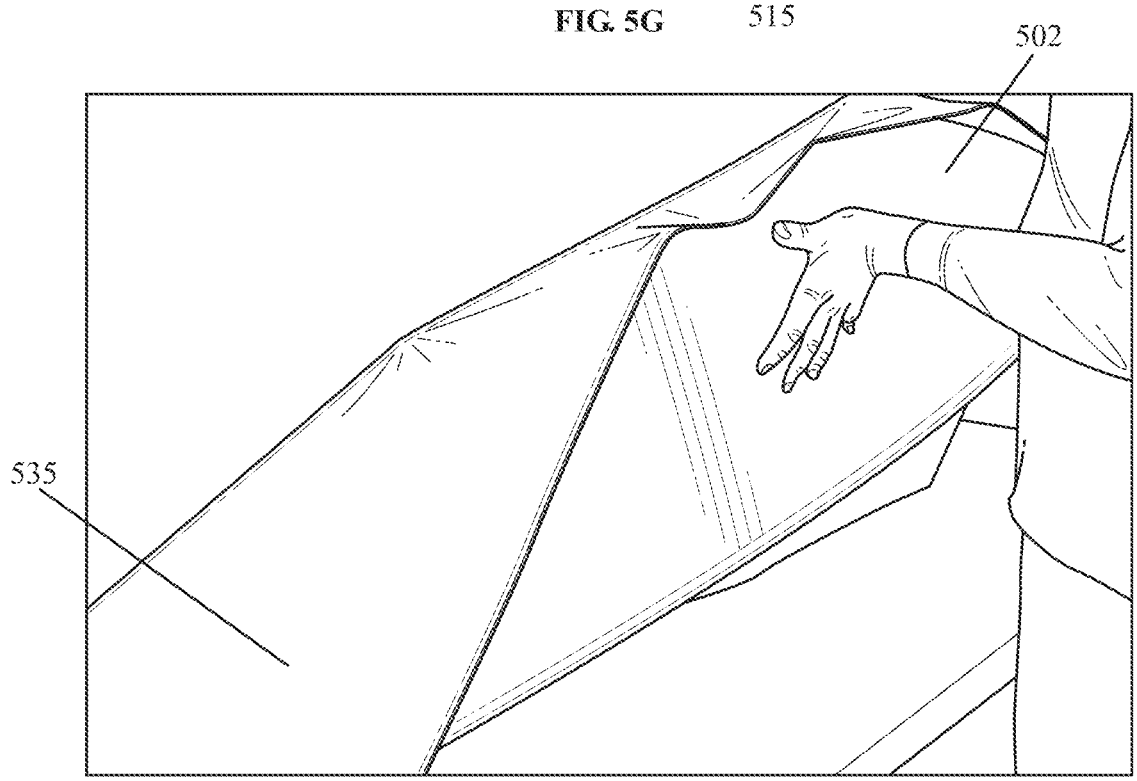
Figure 5I:
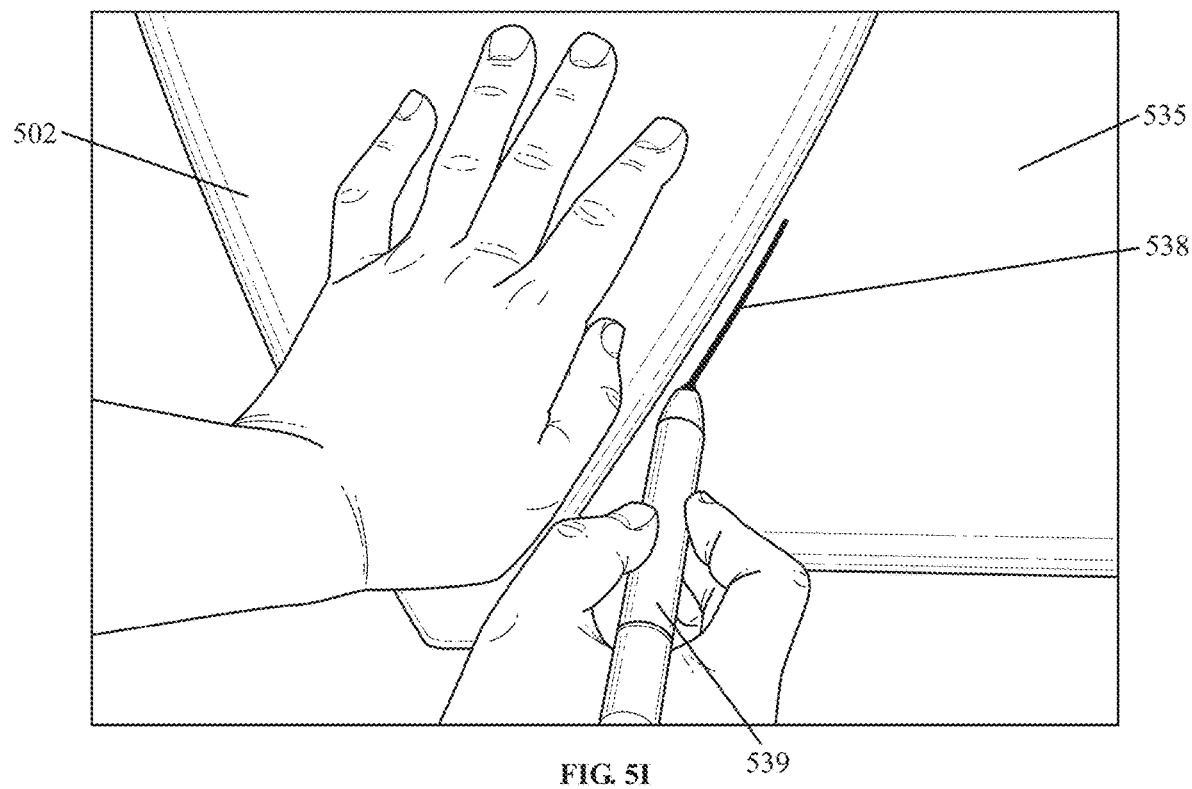

Once the substrate film sheet 535 has been secured to the board sports board 502 via the multiple adhesive elements 532, the user may then turn the board 502 over, such that the substrate film 535 is on the bottom and the board 502 is on the top, as shown in FIG. 5H. Using a marking device (e.g., marker, pen) 539 as shown in FIG. 5I, the user may trace an outline of the board 502 onto the substrate film 535, ensuring the film 535 and/or board 502 do not move during tracing, as shown. It should be noted that only one side of the board outline is traced at this time (i.e., the right side of the board), since the appropriate incremental sizing has only been adjusted for one side of the board (FIG. 5G).

Figure 5J:
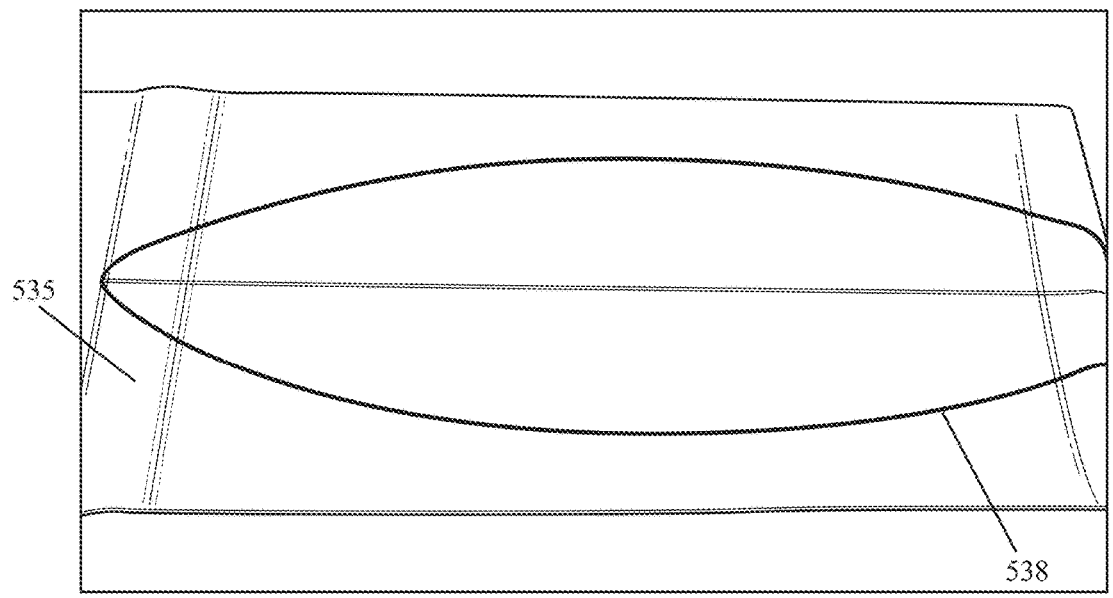

Upon completion of the tracing outline for the first lengthwise half of the board sports board 502, the user may flip the board 502 back over, such that the board 502 is on the bottom and the substrate film 535 is on the top. The user may then repeat the steps shown in FIGS. 5F-5I for the other lengthwise half of the board. As shown in FIGS. 5F and 5G, the user should take note of the other step indicator 516 and align the centerline mark 536 with the appropriate corresponding off centerline on the other side of the centerline 521 (e.g., ¾ inch off-center zone on the side labeled "STEP 2"). Once the user makes the proper alignment, attaches the substrate film 535 to the board 502 via the multiple adhesive elements 532, flips the board 502 over (as in FIG. 5H) and traces the other half of the board sports board 502 onto the substrate film 535, the board 502 may be removed from the substrate film sheet 535. After completing the steps above, the exact profile 538 of the board sports board should be fully traced and marked onto the substrate film 535, as shown in FIG. 5J. For the particular example shown in FIGS. 5A-5J, the final trace outline 538 should match the exact profile of the surfboard 502, with the trace outline being ¾ inches smaller than the exact outline of the surfboard 502. In other words, the distance between the centerline mark 536 and an edge of the trace outline 538 is ¾ inches smaller than the distance between the stringer 530 and the actual edge of the board 502. Thus, an advantage of the tracing process disclosed herein may be the ease and accuracy with which a board sports board trace outline may be obtained, such that the trace outline is the exact size or incrementally larger or smaller than the size of the board.

Figure 5K:
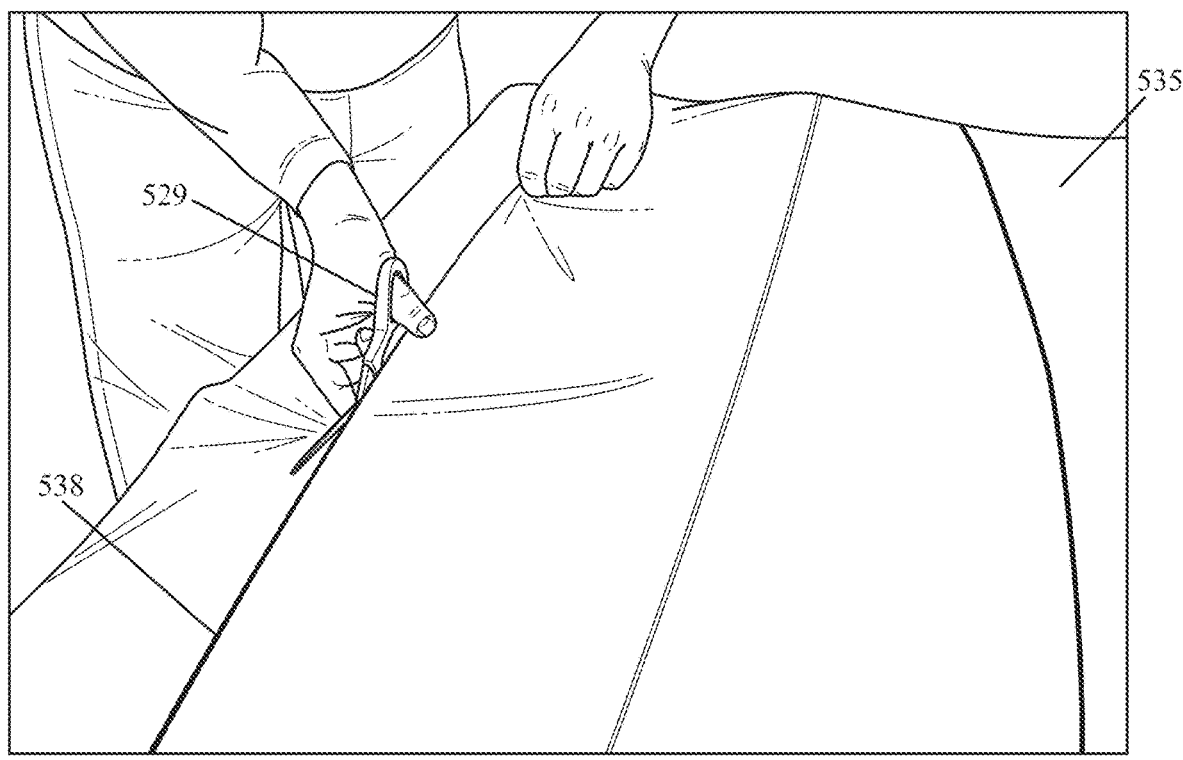

Finally, the user may use a cutting device (e.g., scissors, boxcutter, knife) 529 to carefully cut out the final trace outline 538 on the substrate film sheet 535, as shown in FIG. 5K. The tracing scale(s) (501 in FIG. 5B) and adhesive elements (532 in FIG. 5D) may be removed from the surface of the board sports board 502. The trace outline 538 may then be installed onto the surface of the board sports board 502, which will be discussed in further detail herein below.

Figure 6A:
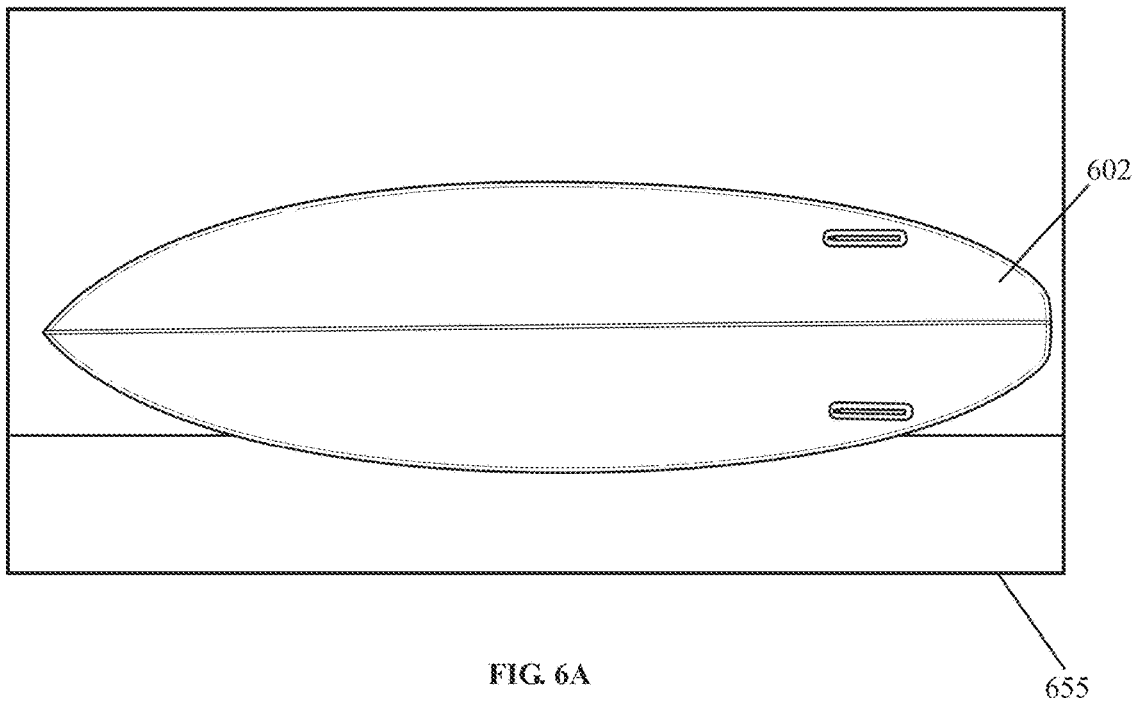
FIGS. 6A-6B show an exemplary photo, and an exemplary trace outline, of a board sports board, respectively, in an example of an alternative tracing process for obtaining a trace outline and substrate film cutout of a board sports board, according to an aspect.
Figure 6B:
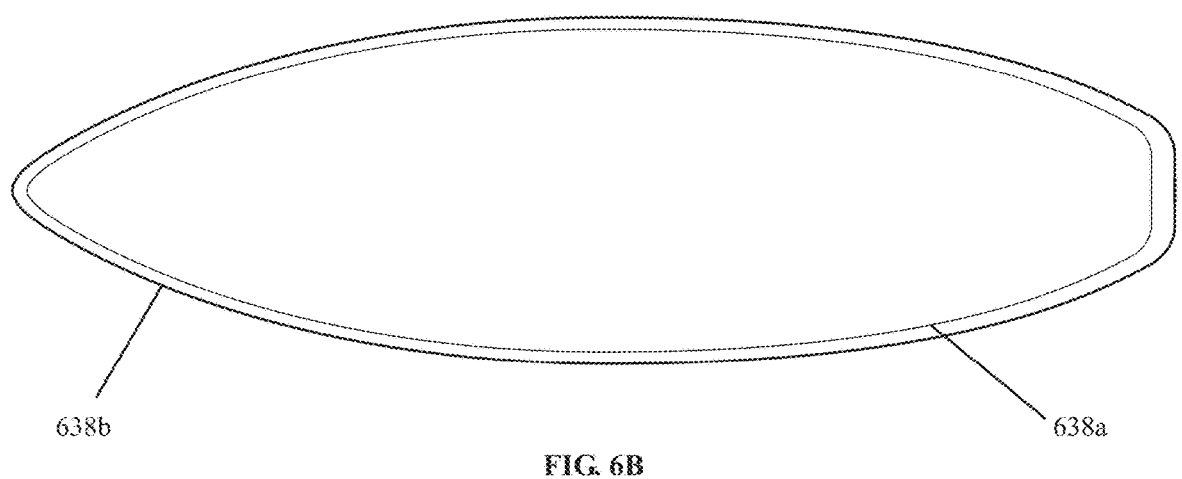

FIGS. 6A-6B show an exemplary photo, and an exemplary trace outline, of a board sports board, respectively, in an example of an alternative tracing process for obtaining a trace outline and substrate film cutout of a board sports board, according to an aspect. As an alternative process of obtaining a trace outline of a board sports board 602, the user may first take a photo or scan of the board, such that the board is well-centered within the frame 655 of the photo, as shown in FIG. 6A as an example.

The user may then upload a file of the photo containing the board sports board 602 into any image processing software application (e.g., Adobe Illustrator®), ensuring the file is in a compatible format. The board shape in the photograph (FIG. 6A) can be traced in the image processing software. It should be noted that an outline for the entire board may be drawn or traced onto the photograph by the user in the software application, or an outline for a lengthwise half of the board may be drawn or traced, wherein the lengthwise half of the drawn outline is mirrored to create a whole outline, which may produce a more accurate final outline.

Then, the user may adjust the scale and/or dimensions of the drawn outline in the software application to match the desired final cut size and dimensions of the substrate film for the board. The user may input the desired width and length dimensions into the application, such that the software application may appropriately scale the trace outline of the board 602. As shown in FIG. 6B as an example, the length and/or width of the drawn outline of the board may be reduced or enlarged proportionately, resulting in a reduced outline 638*a* or enlarged outline 638*b* of the original board outline dimensions having the same overall board shape.

The user may then save a file of the software-generated board outline and send the file to a digital cutter. The digital cutter may be a roll feed cutter or flatbed plotter cutter, as examples. The digital cutter may be provided with a roll of substrate film for obtaining a trace outline in the film. The digital cutter may then cut the outline of the board into the substrate film, producing a final trace outline that is an exact, smaller or larger outline, in any increment of inches or millimeters, of the shape of the board sports board 602. Thus, an advantage of the alternative tracing process disclosed herein may be the ease, speed and accuracy with which a board sports board trace outline may be obtained, such that the trace outline is the exact, smaller or larger size of the board.

Figure 7A:
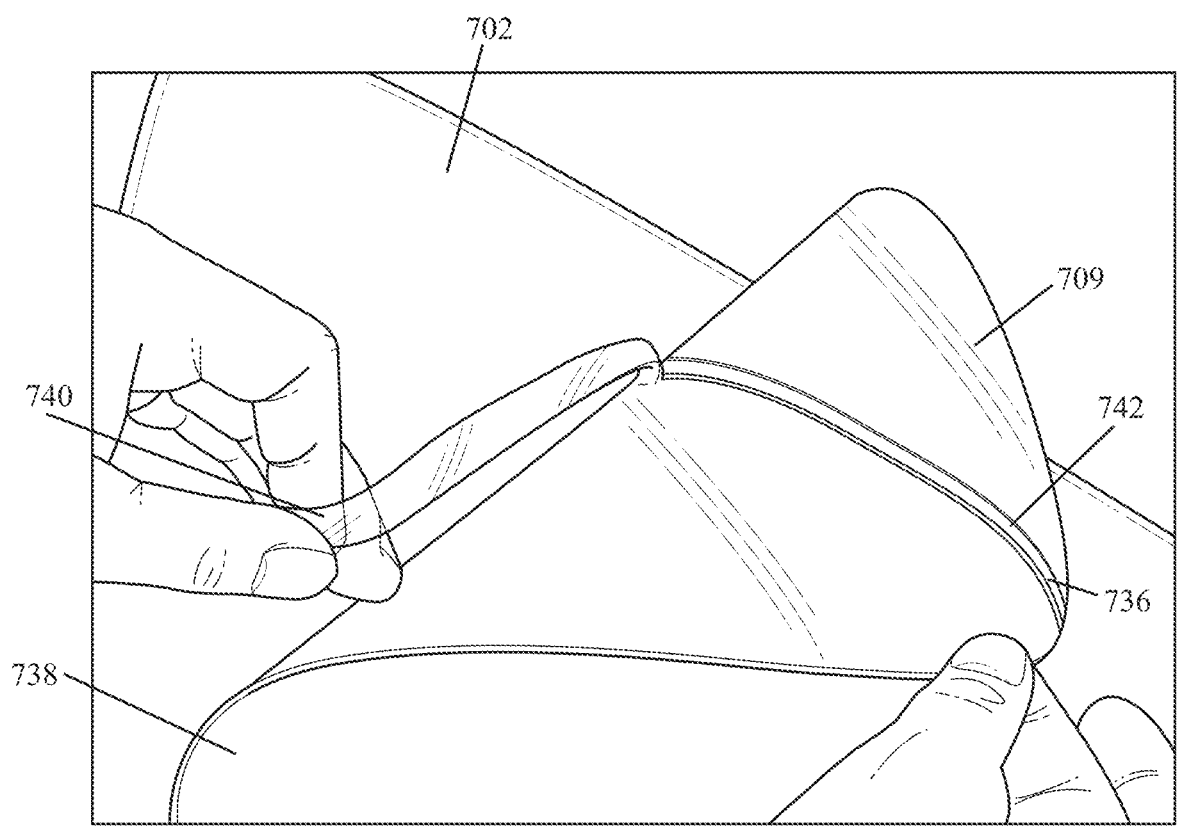
FIGS. 7A-7P show exemplary steps in an example of a process of applying an adhesive-backed substrate film cutout onto a board sports board, according to an aspect.
Figure 7B:
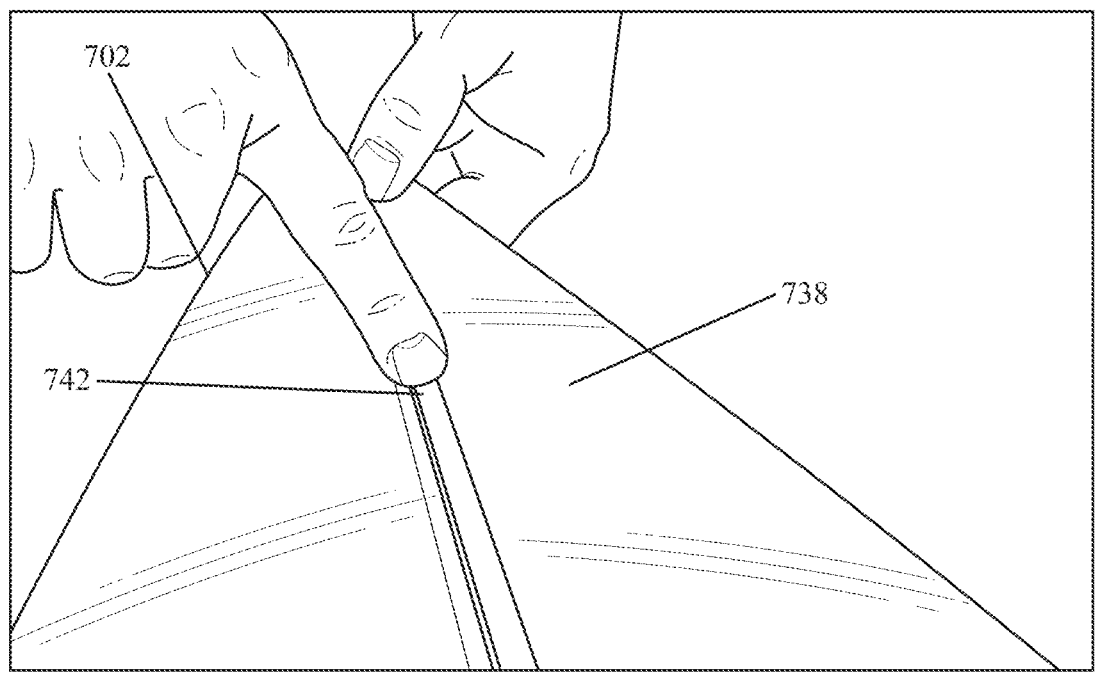
Figure 7C:
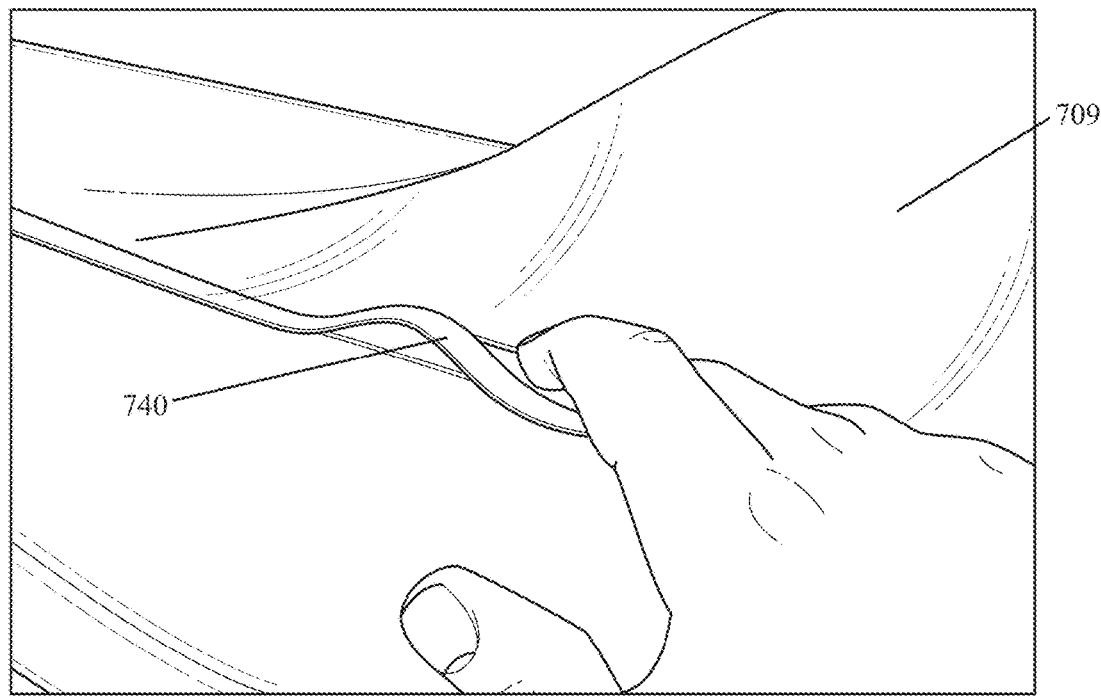
Figure 7D:
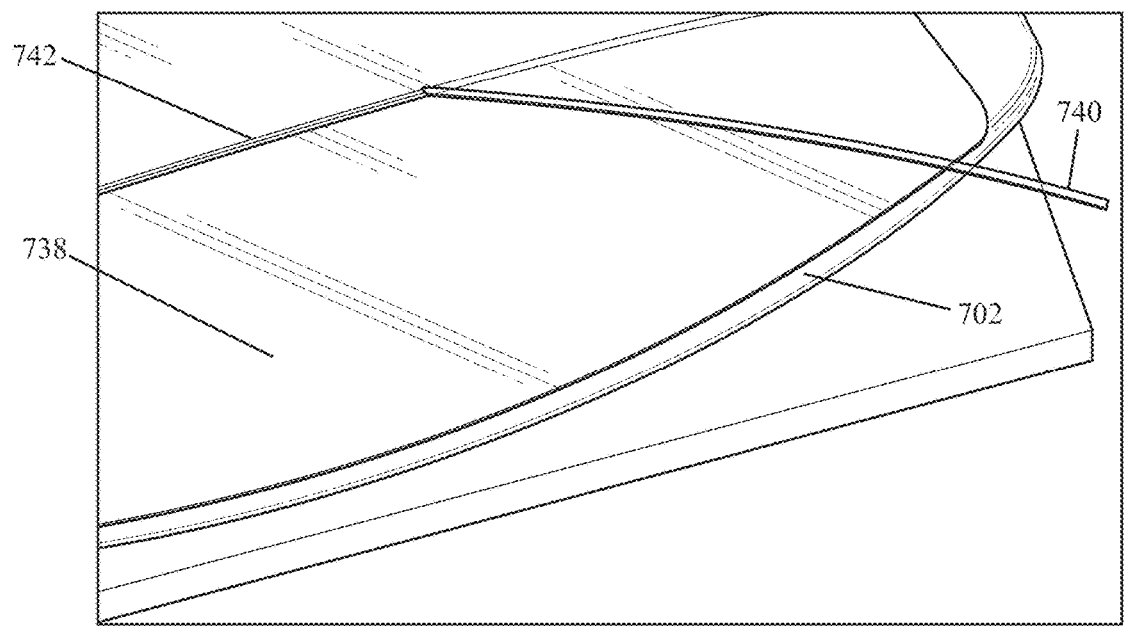
Figure 7E:
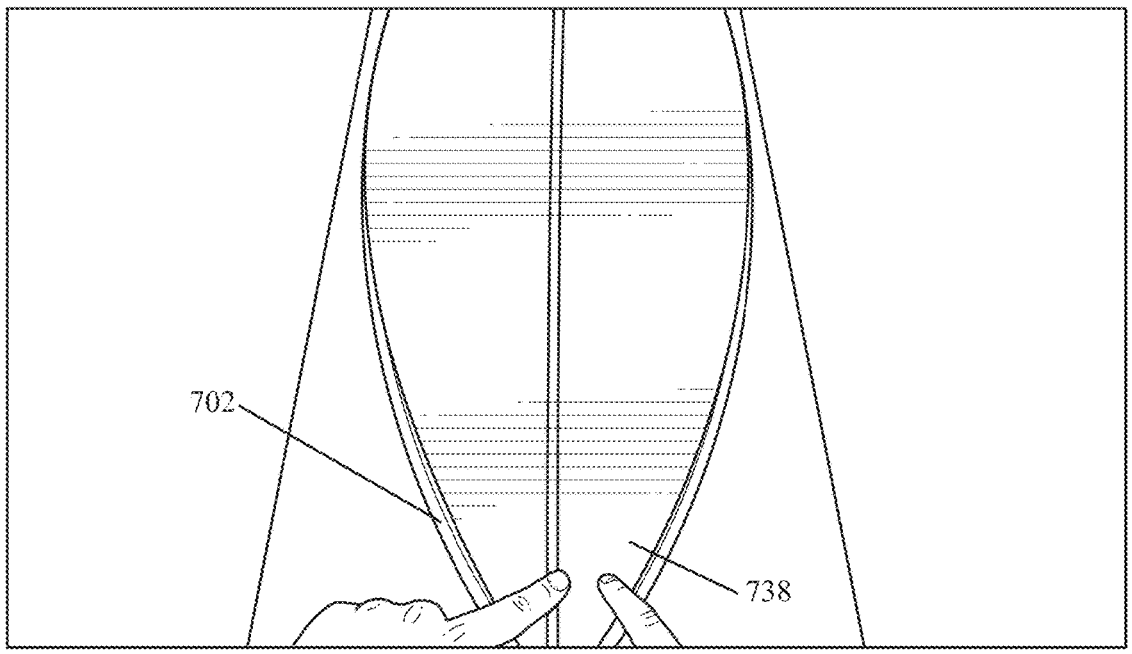
Figure 7F:
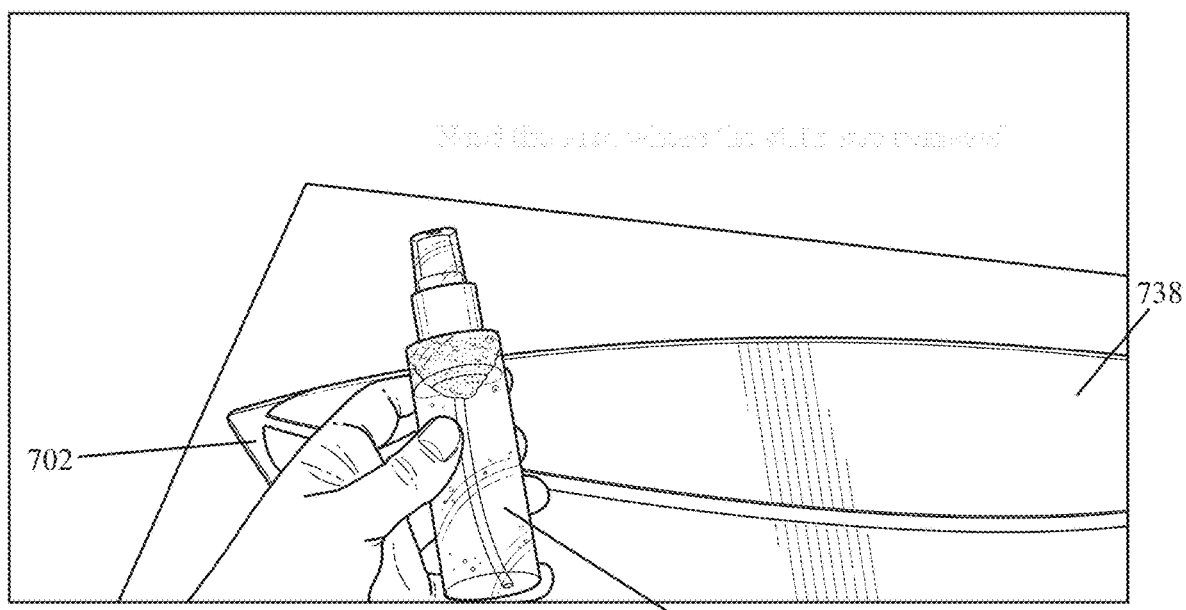
Figure 7G:
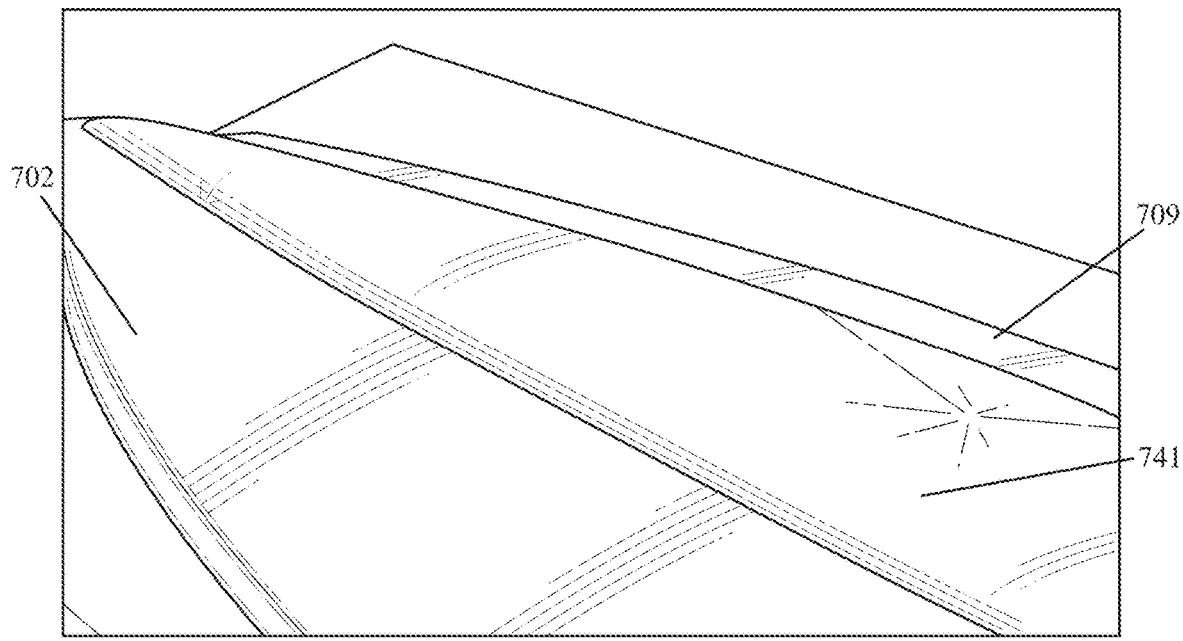
Figure 7H:
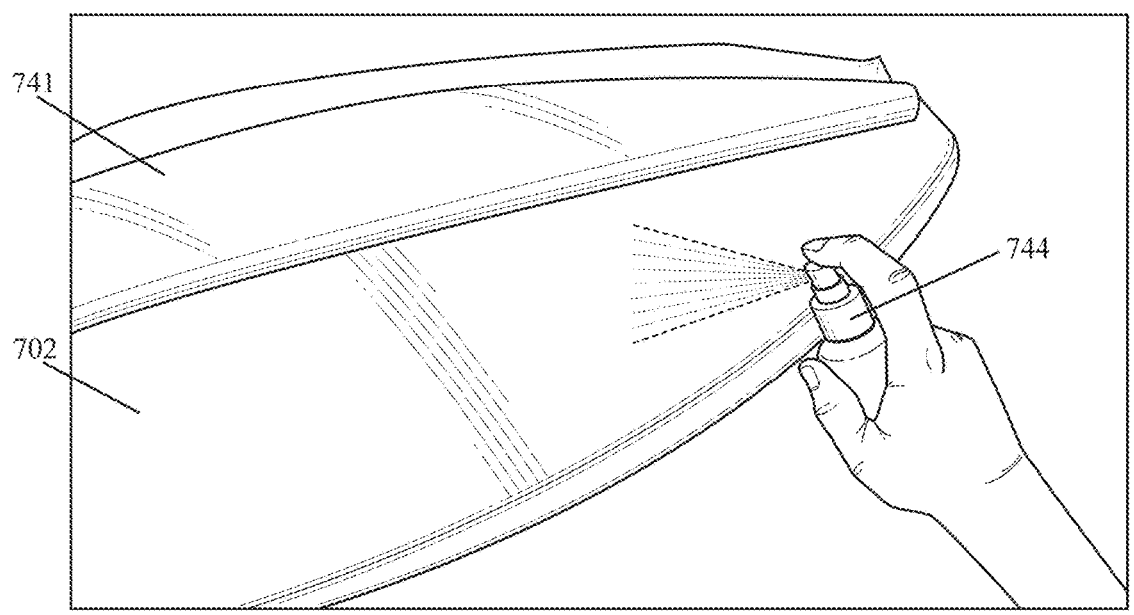
Figure 7I:
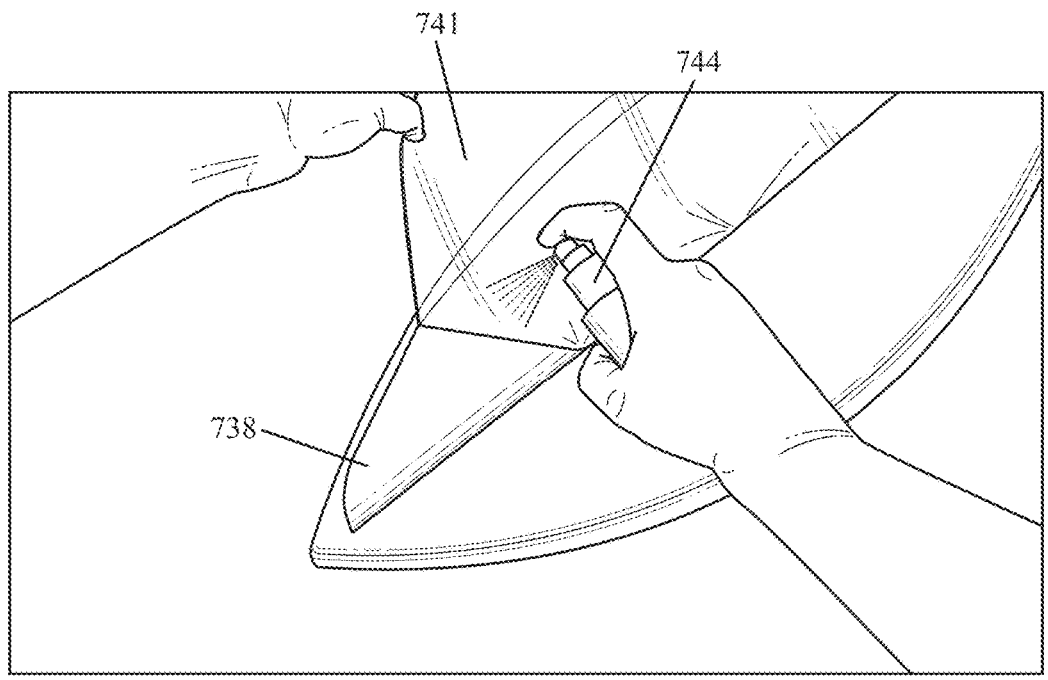
Figure 7J:
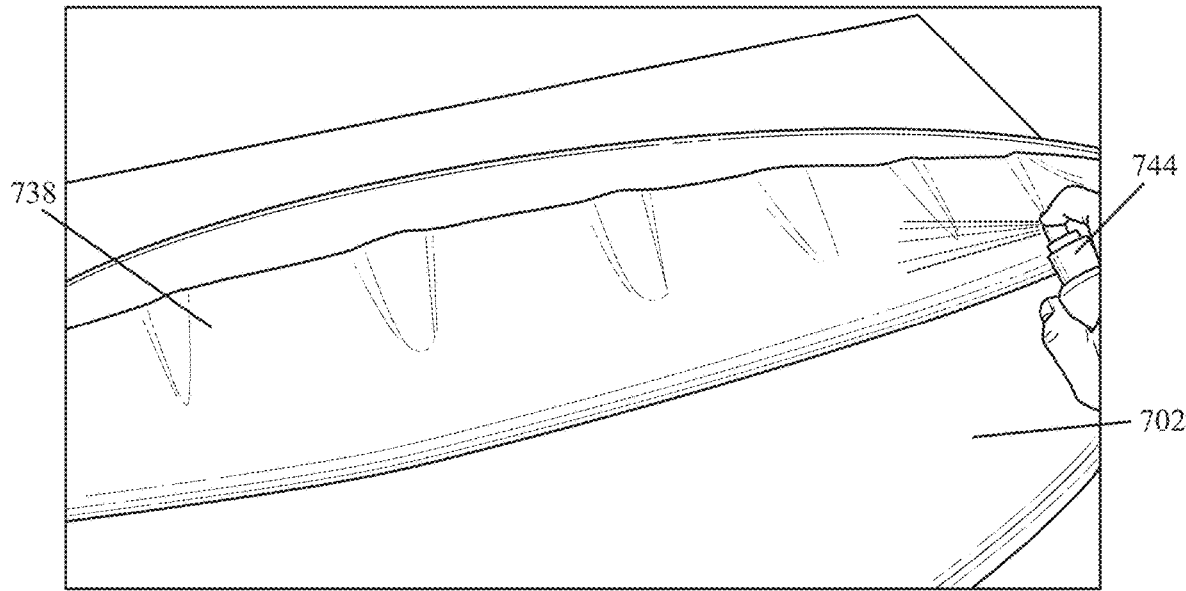
Figure 7K:
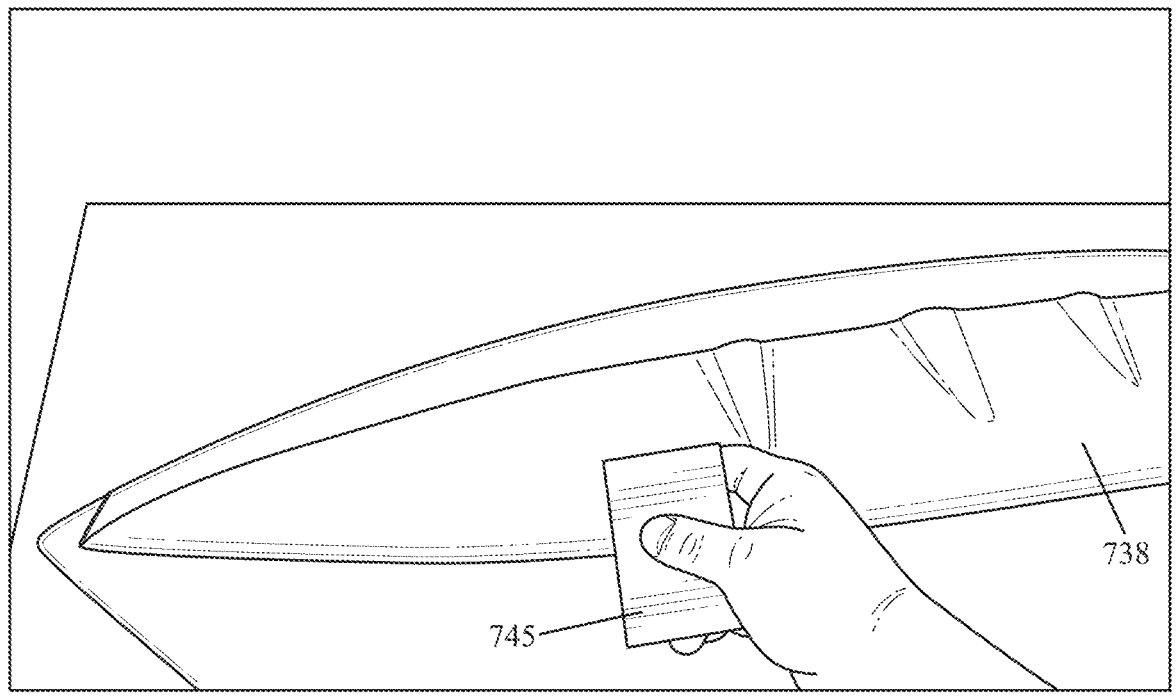
Figure 7L:
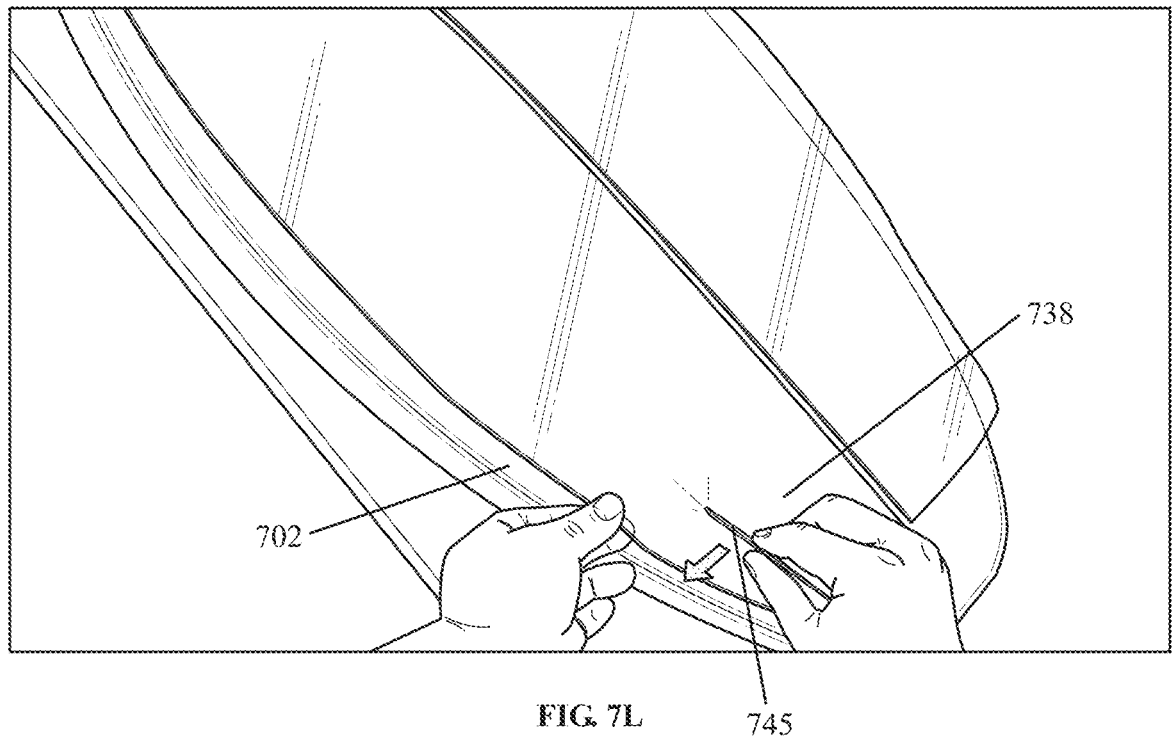
Figure 7M:
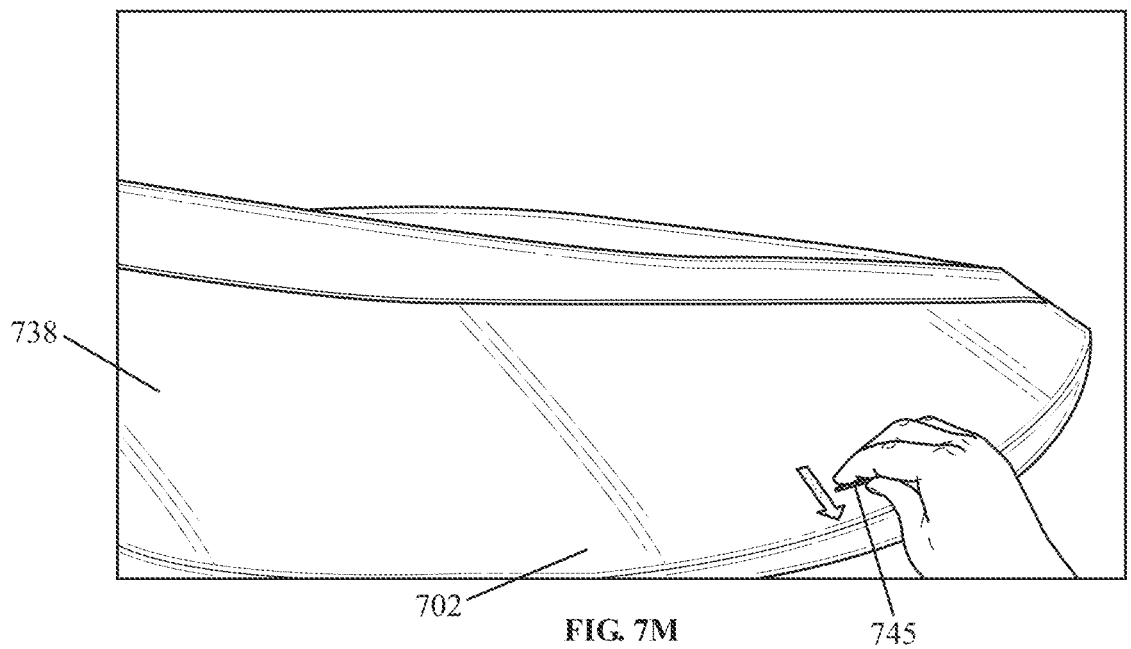
Figure 7N:
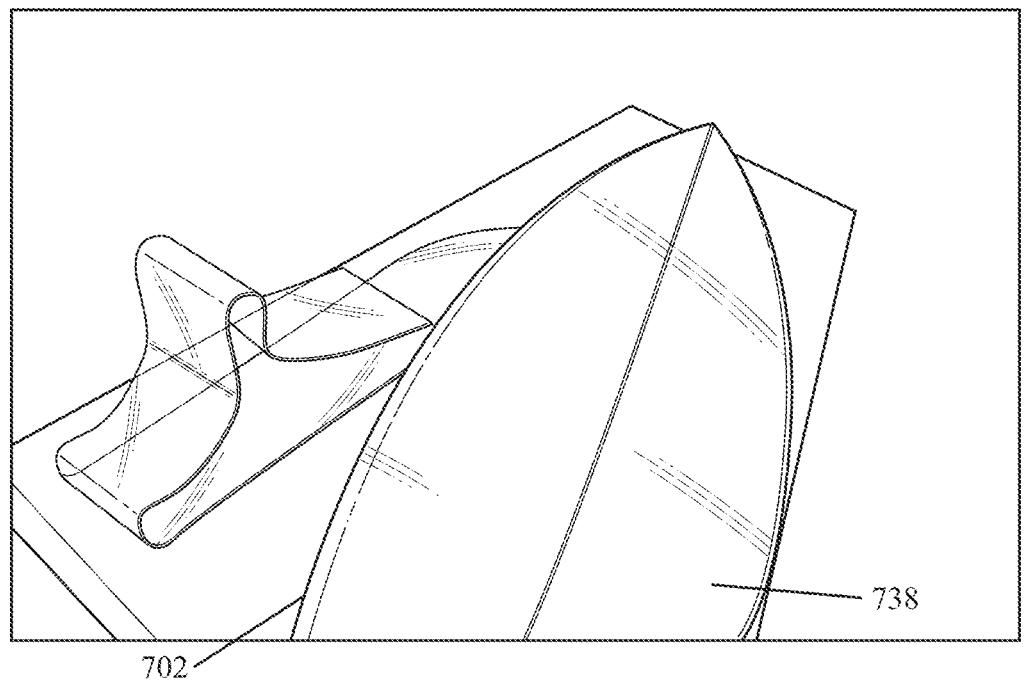
Figure 7O:
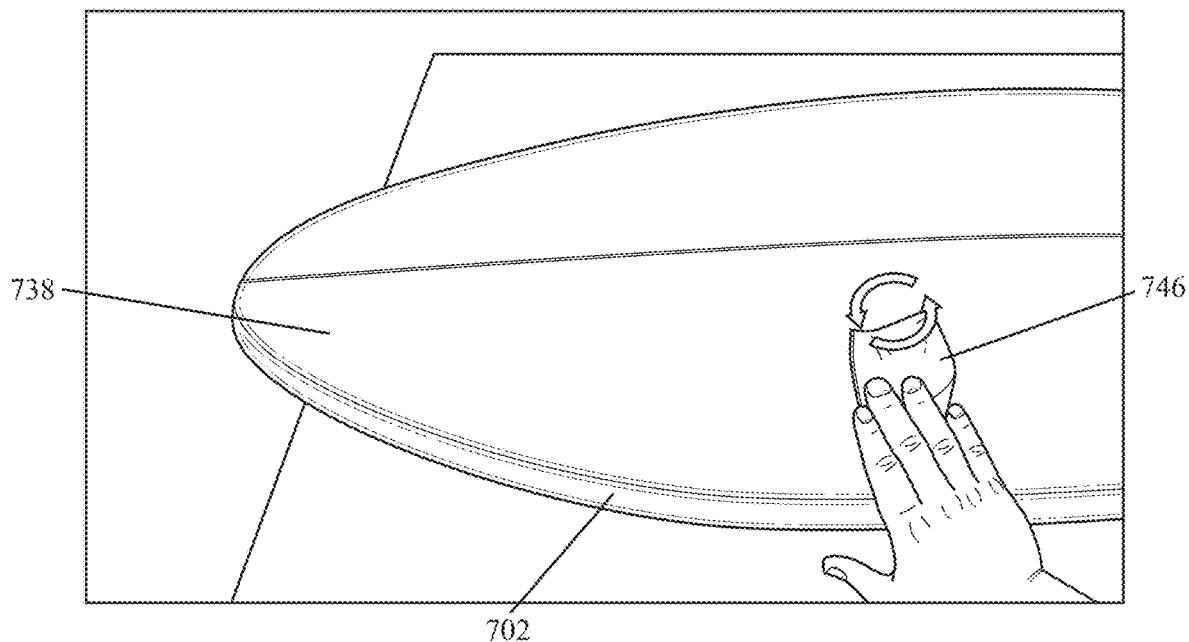
Figure 7P:
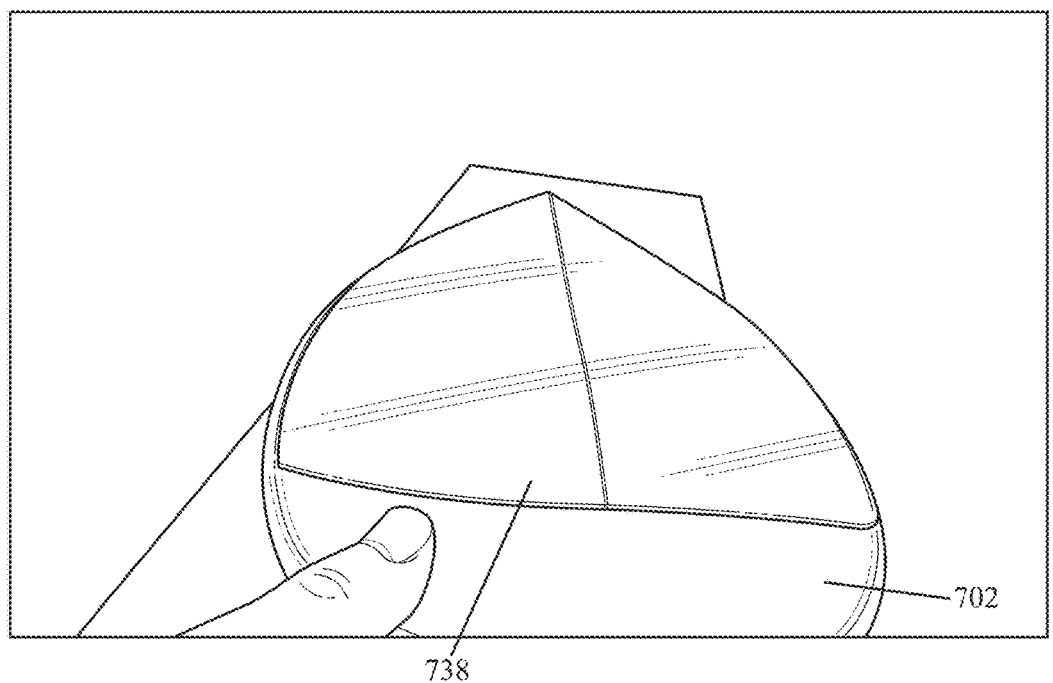

FIGS. 7A-7P show exemplary steps in an example of a process of applying an adhesive-backed substrate film cutout 738 onto a board sports board 702, according to an aspect. As mentioned previously herein above, the application process shown in FIGS. 7A-7P allows the adhesive-backed substrate film cutout 738 to be installed onto the surface of a board sports board 702 with ease and precision. The application process may directly follow the tracing processes disclosed in FIGS. 5A-5K or FIGS. 6A-6B above, as an example. It should be understood that the following exemplary steps of the application process are performed on a first half of the board sports board (i.e., half of the board lengthwise) and are then repeated for a second half of the board sports board.

As shown in FIG. 7A, the adhesive-backed substrate film cutout 738 may be laid on top of the board sports board 702 to initiate the application process. The pre-scored center peel strip 740 may be peeled back from the one-sided release liner 709 to partially expose a center adhesive area 742 in the substrate film 738. The center adhesive area 742 may be provided with the centerline marker 736 that may allow the user to center the substrate film cutout 738 onto the board sports board surface 702. As shown in FIG. 7B, the user may apply pressure onto the exposed center adhesive area 742 in the substrate film cutout 738 after the film has been properly centered onto the board 702. Applying pressure onto the center adhesive area 742 allows the substrate film cutout 738 to temporarily adhere to the board 702 to enable proper application of the rest of the substrate film 738.

The user may continue to peel back the center peel strip 740 from the one-sided release liner 709, as shown in FIG. 7C. As the user peels back the center peel strip 740, the user may also apply pressure to the newly exposed center adhesive area 742, as shown in FIG. 7D. Applying pressure onto the newly exposed center adhesive area 742 as the center peel strip 740 is completely peeled away may allow the substrate film cutout 738 to remain centered on the surface of the surfboard 702, as shown as an example. Once the center peel strip 740 is completely removed from the one-sided release liner, the substrate film cutout 738 should be secured and centered on top of the board 702, as shown in FIG. 7E.

As shown in FIG. 7F, a solution of water and about two drops of dish soap may be mixed in an atomizing spray bottle 744, as an example. The solution may allow the substrate film to be easily handled and positioned and may prevent the user's fingers from sticking to the adhesive layer. Next, the user may take a first half of the release liner 709 and fold it over the other half, such that the side peel strip 741 is on the top and one side of the surfboard 702 is exposed, as shown in FIG. 7G.

As shown in FIG. 7H, the user may use the atomizing spray bottle 744 to begin spraying the exposed side of the board sports board 702 with the water and dish soap solution. The user may spray generous amounts of the solution onto the board 702, such that the entire exposed surface of the board 702 is well-lubricated, as shown. The user's fingers and hands may also be sprayed with the solution using the spray bottle 744 to prevent the user's fingers from sticking to the adhesive during handling of the release liner peel strip 741.

Next, the user may take the side peel strip 741 that has been folded over and may peel away the peel strip 741 from the substrate film cutout 738, as shown in FIG. 7I. As the side peel strip 741 is peeled away from the substrate film 738, the user may use the spray bottle 744 to spray the water and soap solution onto the exposed adhesive area of the substrate film 738, as shown. As shown in FIG. 7J, the user may continue peeling back the side peel strip 741 and spraying the exposed adhesive on the substrate area until the exposed adhesive on the substrate film 738 is well-lubricated. As mentioned previously above, spraying the water and dish soap solution onto the exposed areas of the adhesive on the substrate film cutout 738 may facilitate easy handling and positioning of the substrate film 738.

As shown in FIG. 7K, the user may obtain a squeegee or spreader (e.g., a credit card) 745 to aid in the application of the lubricated substrate film cutout 738 onto the board. Starting at one end of the board sports board 702, the user may begin slowly laying the lubricated adhesive-backed substrate film 738 onto the wetted surface of the board 702, as shown in FIG. 7L. As shown, the user may use the spreader 745 in slow light pressure strokes to begin smoothing out the substrate film 738 and pushing out the water and dish soap solution and any air bubbles from under the substrate film 738, as an example. The user may continue smoothing out the substrate film 738 until the film is completely flat on the surface of the board 702 and no air bubbles remain under the film cutout 738, as shown in FIG. 7M.

Upon completion of application of the first half of the substrate film cutout 738 onto the board 702, the user may repeat the steps shown in FIGS. 7F-7M to apply the second half of the substrate film onto the other side of the board 702. FIG. 7N illustrates an example of the substrate film cutout 738 applied fully onto the surface of the surfboard 702, such that the water and dish soap solution and any air bubbles have been fully removed from under the film 738.

As shown in FIG. 7O, the user may then take a wiping cloth (e.g., paper towel, napkin, hand towel) 746 and begin wiping off any remaining solution from the surface of the substrate film cutout 738. The wiping cloth 746 may also be used to remove the water-erasable centerline mark from the substrate film 738, resulting in the transparent, clean application of the film onto the board sports board 702, as shown in FIG. 7P. Once any excess solution and any remaining air pockets have been wiped from the substrate film cutout 738, the user may leave the assembly shown in FIG. 7P to dry for 24 to 48 hours, as an example. Allowing the substrate film adhesive to bond to the board for this extended period of time may enable the substrate film cutout 738 to completely bond to the surface of the board 702. The user may then use the surfboard 702 to surf, paddle, or wakeboard etc. in any body of water without the substrate film 738 peeling off, as an example.

An advantage of the method of applying the adhesive-backed substrate film disclosed herein may be the ease with which the film is applied onto the board sports board. Another advantage may be that the method may enable the installation of any size, width or length of adhesive-backed substrate film onto any flat, semi-flat or semi-complex curved surface that would require traction.

Figure 8A:
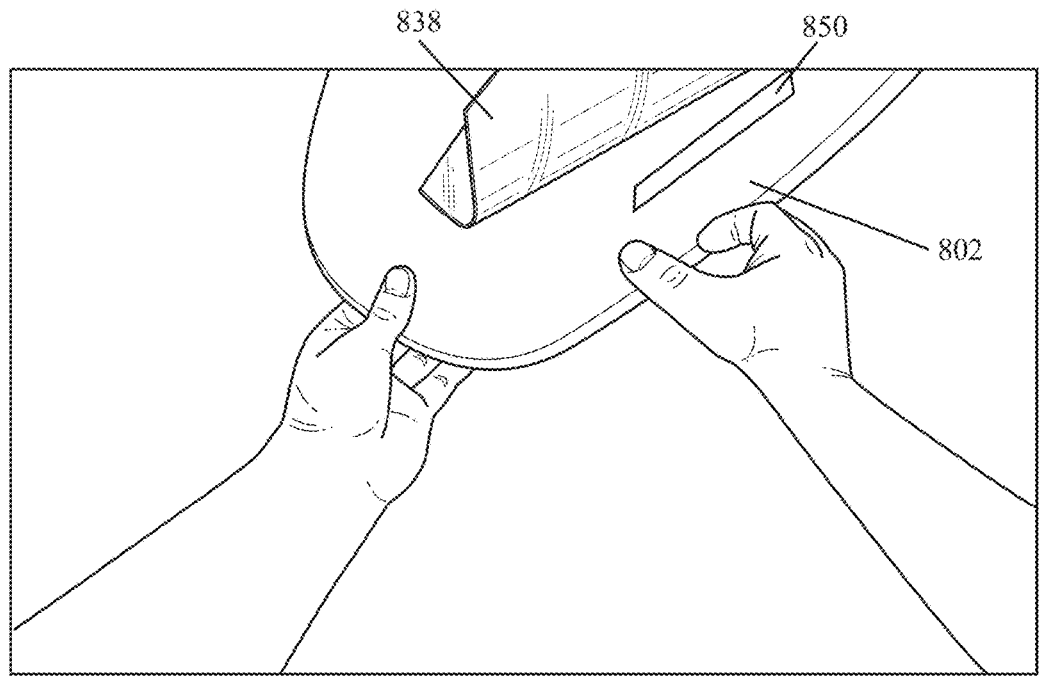
FIGS. 8A-8C show exemplary steps in an example of a process of applying a sticker onto a board sports board with an adhesive-backed substrate film cutout, according to an aspect.
Figure 8B:
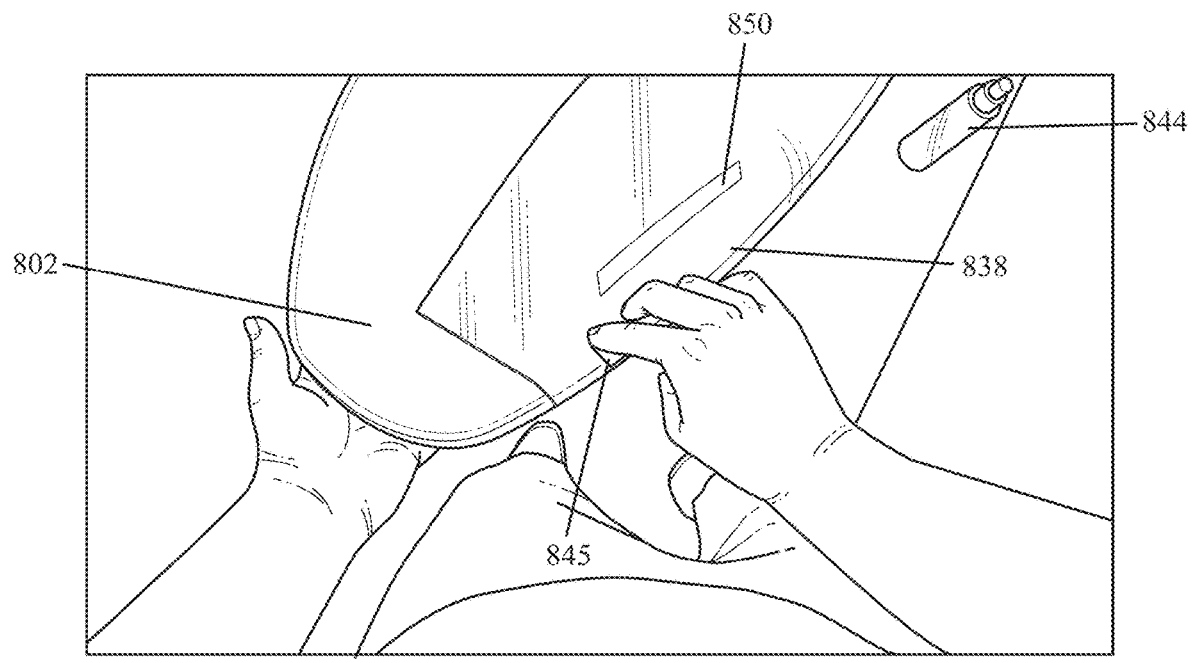
Figure 8C:
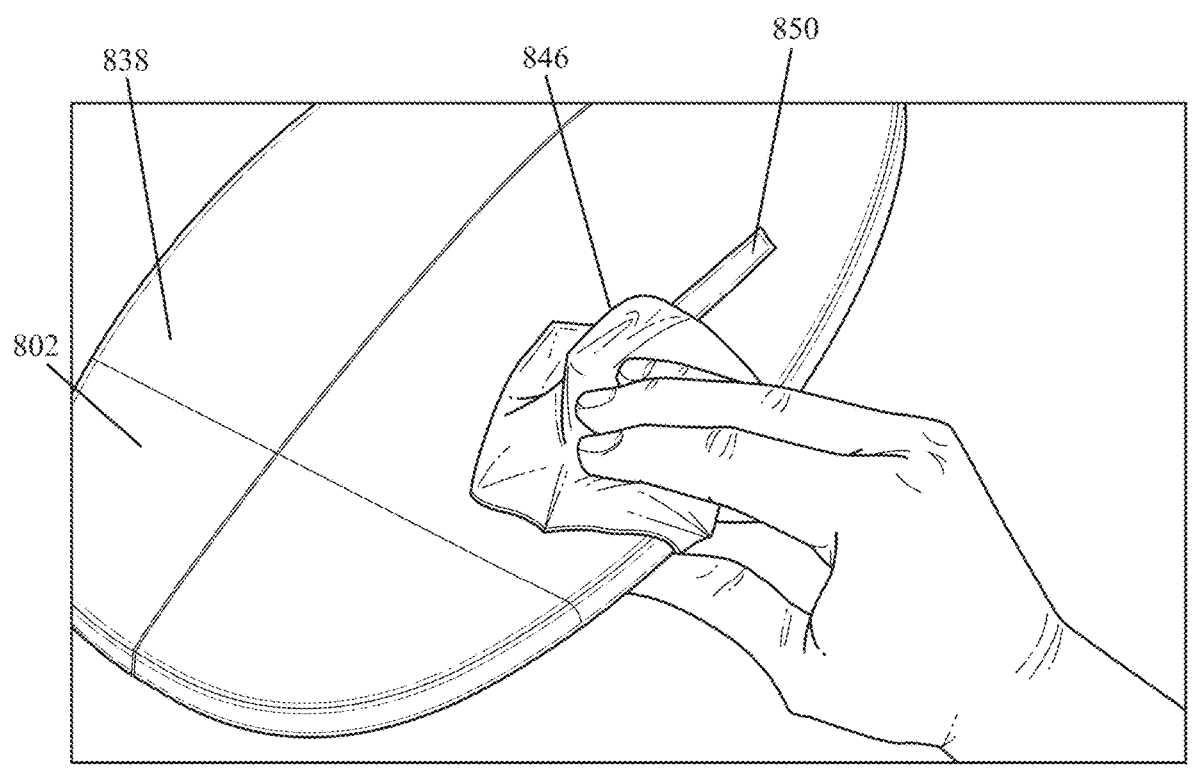

FIGS. 8A-8C show exemplary steps in an example of a process of applying a sticker 850 onto a board sports board 802 with an adhesive-backed substrate film cutout 838, according to an aspect. The application process disclosed in FIGS. 7A-7P may accommodate the addition of aesthetic pieces, such as stickers, decorative adhesives, or decals, that may be placed onto the surface of a board sports board for decorative purposes. The exemplary steps shown in FIGS. 8A-8C may occur prior to the step shown in FIG. 7A disclosed herein above. As shown as an example in FIG. 8A, a portion of the substrate film cutout 838 may be rolled back, such that an area of the surface of the board 802 is exposed. The user may apply the sticker 850 onto the exposed area of the board 802, as shown.

As shown in FIG. 8B, the substrate film 838 may be applied onto the surface of the board 802, such that the sticker 850 now lies under the film 838. As demonstrated previously in FIGS. 7I-7K, the spray bottle 844 may be used to spray the substrate film cutout 838 with the water and soap solution, as an example. As shown, the spreader 845 may then be used to smooth out the substrate film 838 and push out the water and dish soap solution and any air bubbles from under the substrate film 838. As shown in FIG. 8C, the wiping cloth 846 may be used to wipe off any remaining solution from the surface of the substrate film cutout 838. Once any excess solution and any remaining air pockets have been wiped from the substrate film 838, the user may leave the board and substrate film assembly to dry for 24 to 48 hours, as an example. Thus, a further advantage of the method of applying the adhesive-backed substrate film cutout may be the accommodation of stickers and decals, such that the stickers and decals may be preserved and protected beneath the substrate film layer during use of the board sports board.

It should be noted that any stickers and/or decals may be placed on the board at any point before application (FIGS. 7A-7P) of the substrate film cutout.

FIGS. 9A-9I show exemplary steps in an example of a process of applying an adhesive-backed substrate film grip 910 onto a board sports board 902, according to an aspect. As shown previously in FIGS. 2A-2D as examples, substrate film grips (e.g., 210 and 211) may be applied to the surface of a board sports board to provide traction on specific areas of the board via the method described herein below.

Figure 9A:
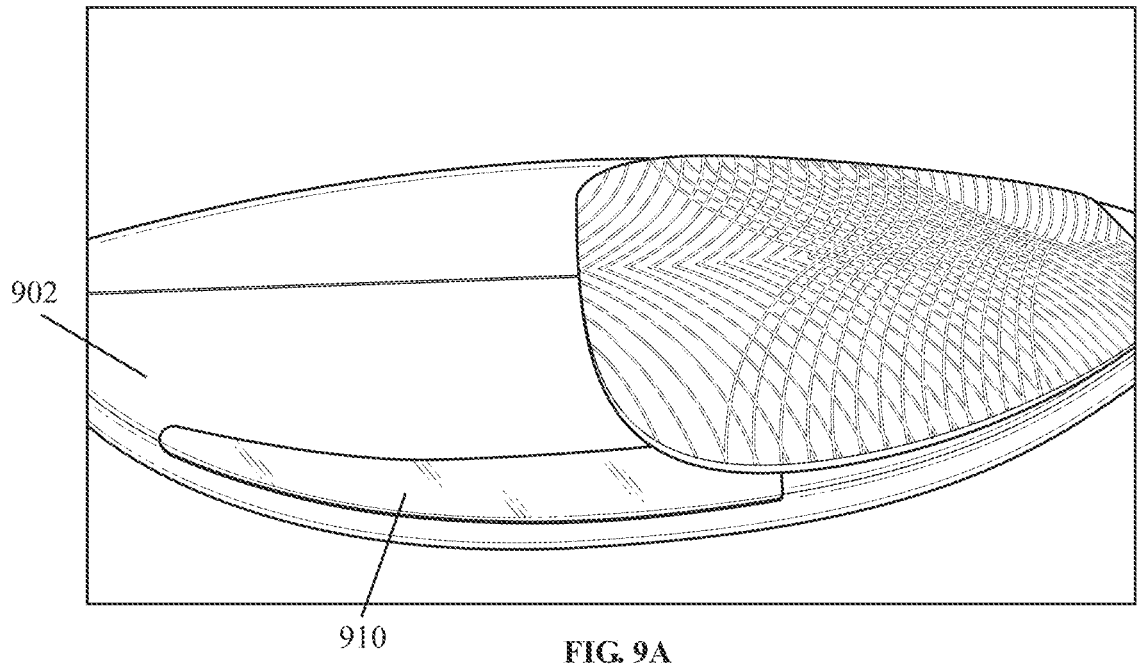
FIGS. 9A-9I show exemplary steps in an example of a process of applying an adhesive-backed substrate film grip onto a board sports board, according to an aspect.

As shown in FIG. 9A, the adhesive-backed substrate film grip 910 may be laid on top of the board sports board 902 to initiate the application process. The user may align the substrate film grip 910 on the surface of the board sports board 902 to determine the specific area the user would like to apply the substrate film grip 910, as shown. Once the area for application has been determined, the user may remove the substrate film grip 910 from the board 902 or move the film grip 910 to another area of the board 902 away from the area for application.

Figure 9B:
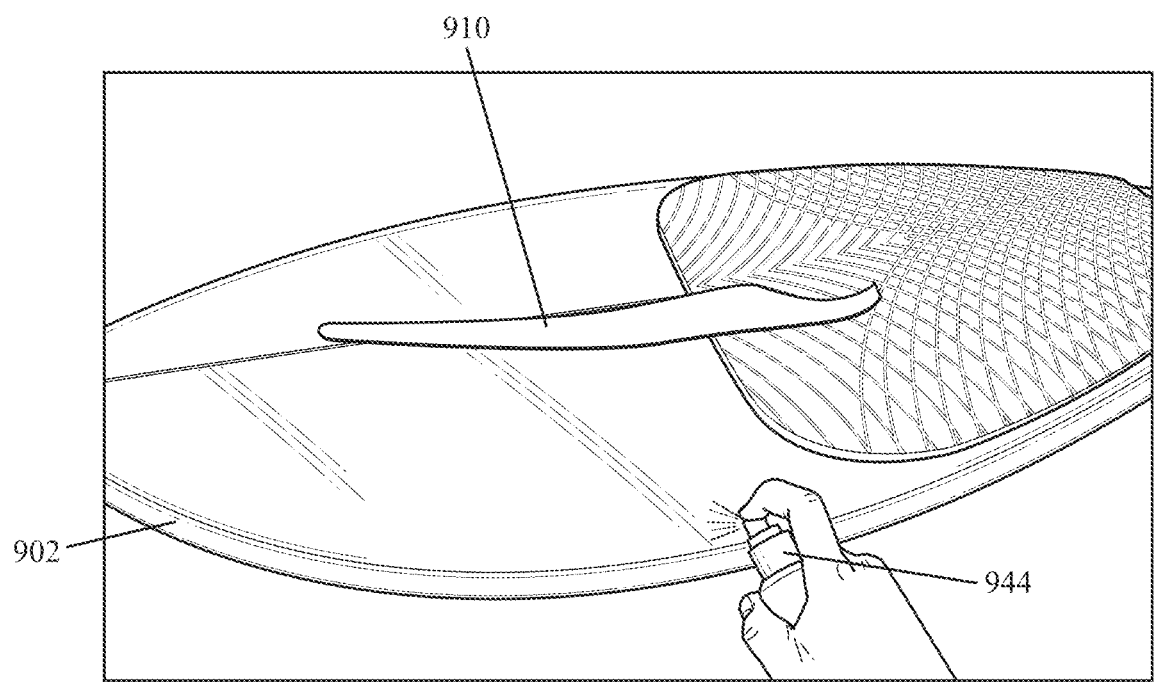

As shown in FIG. 9B, the user may spray the specific area for application with a solution of water and dish soap using an atomizing spray bottle 944. As shown, the user may spray the board 902 with the water and dish soap solution until the area for application is wetted. The user's fingers and hands may also be sprayed with the solution using the spray bottle 944 to prevent the user's fingers from sticking to the adhesive during handling of the one-sided release (941 in FIG. 9C).

Figure 9C:
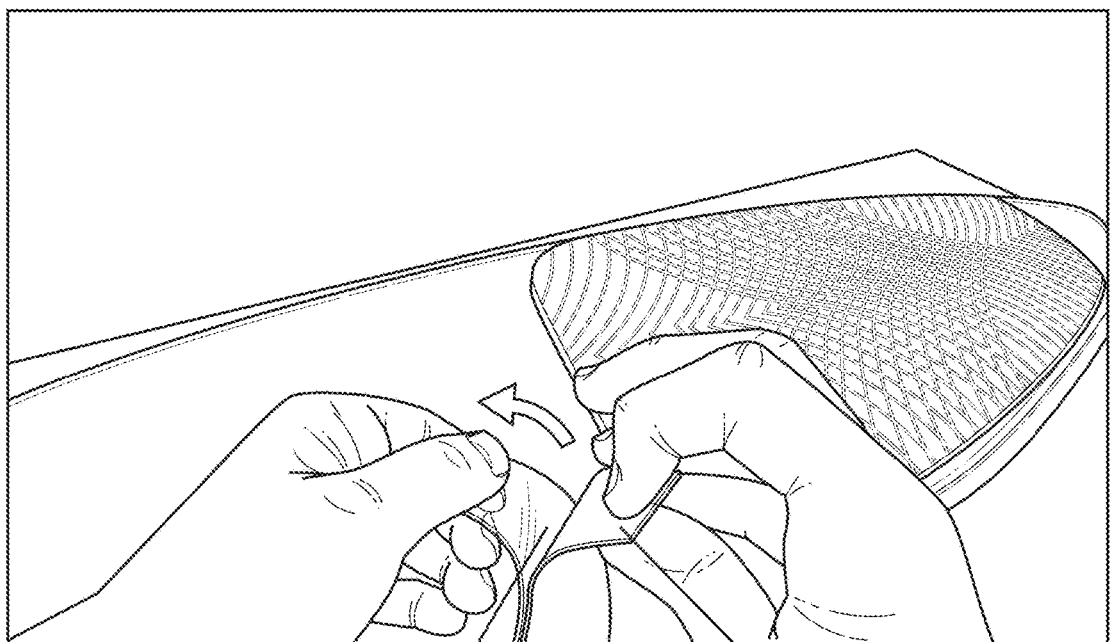
Figure 9D:
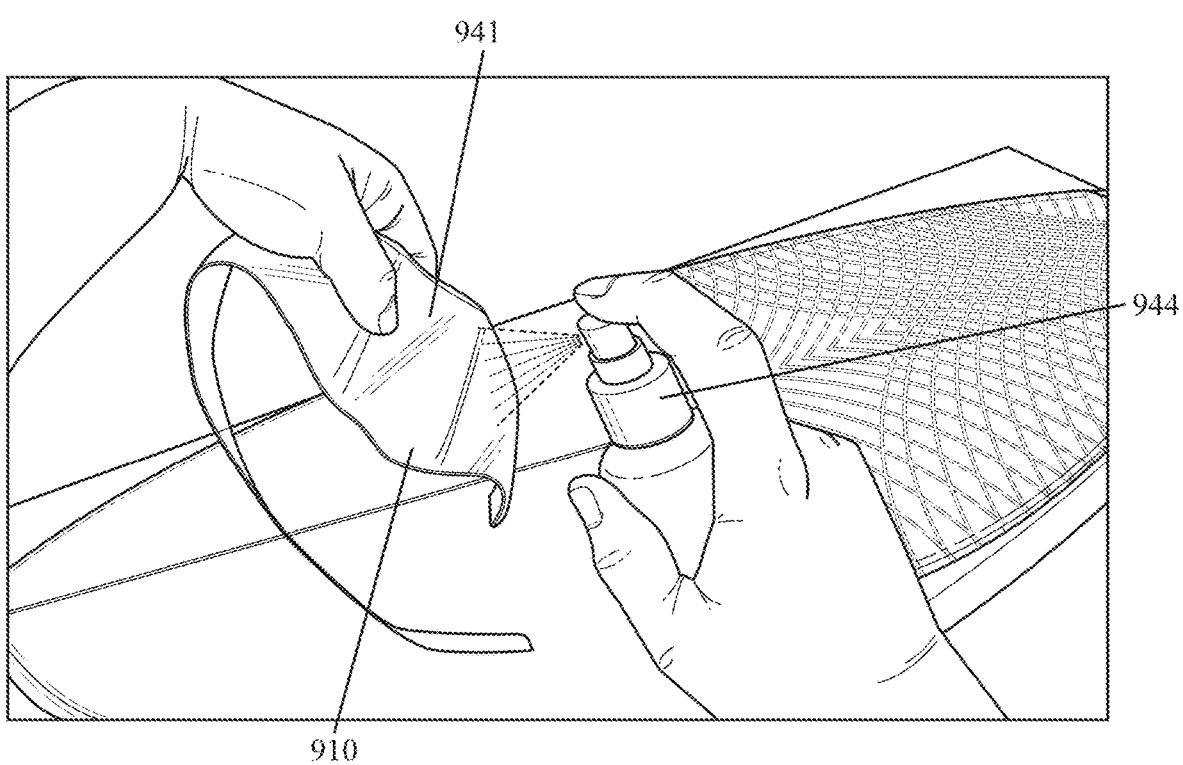

Next, the pre-scored clear, plastic release liner 941 may be partially peeled back from the substrate film 910 to partially expose an adhesive area in the substrate film grip 910, as shown in FIG. 9C. As shown in FIG. 9D, the user may spray the solution onto the partially exposed adhesive area in the substrate film grip 910 using the atomizing spray bottle 944, while keeping the one-sided release liner 941 peeled back. As previously discussed herein above, spraying the water and dish soap solution onto the exposed areas of the substrate film grip 910 may facilitate easy handling and positioning of the substrate film grip 910.

Figure 9E:
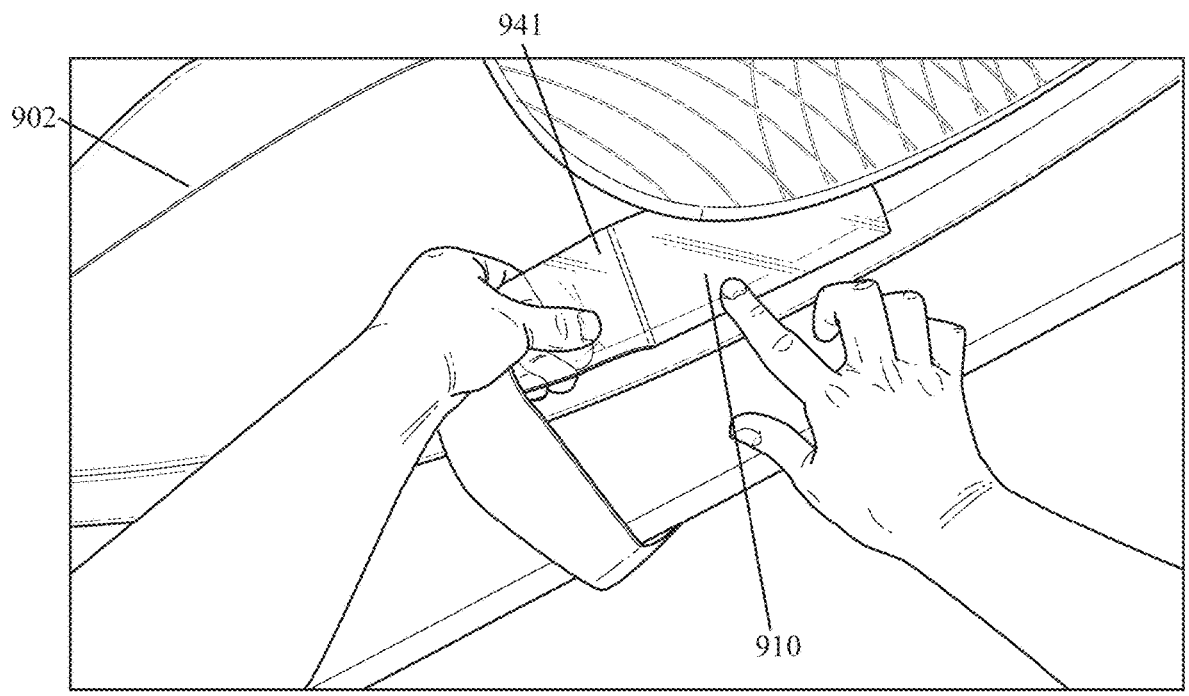
Figure 9F:
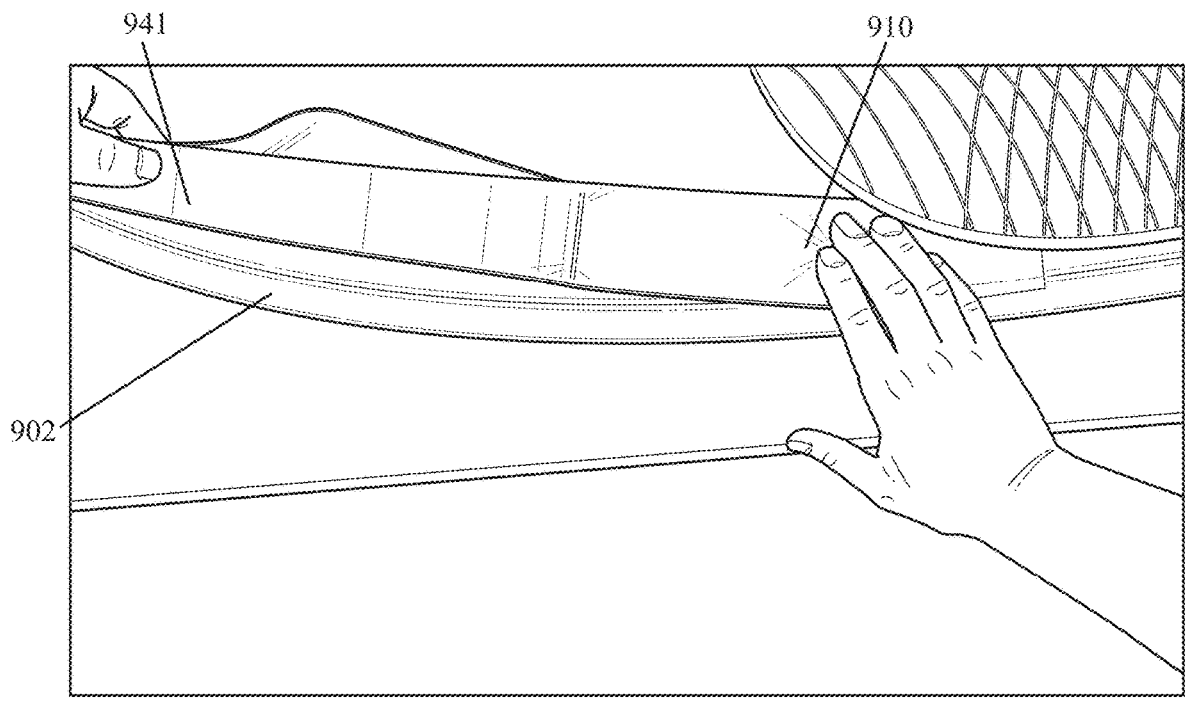

As shown in FIG. 9E, the user may place the wetted portion of the substrate film grip 910 onto the surface of the board sports board 902 and may apply pressure onto the top of the substrate film grip 910 to facilitate adhesion to the board 902. The user may continue to peel back the one-sided release liner 941, as shown in FIG. 9F. As the user peels back the one-sided release liner 941, the user may also apply very light pressure to the newly exposed adhesive areas of the substrate film grip 910, as shown. Applying very light pressure onto the newly exposed adhesive areas as the one-sided release liner 941 is completely peeled away may allow the substrate film grip 910 to be picked up and repositioned, if needed, on the surface of the surfboard 902, as shown in FIG. 9F as an example.

Figure 9G:
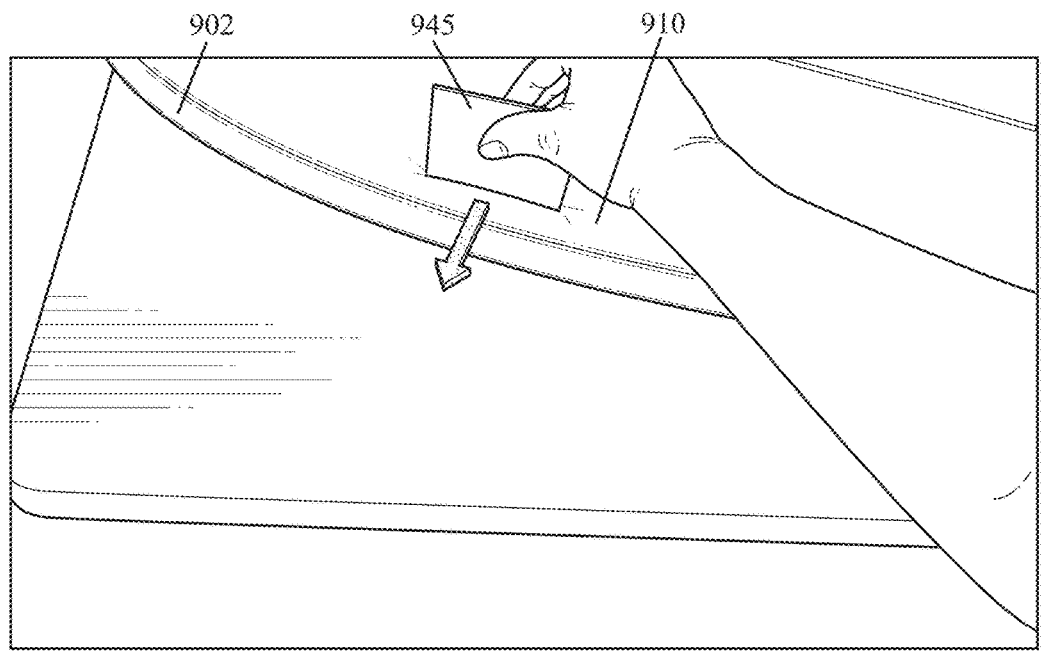
Figure 9H:
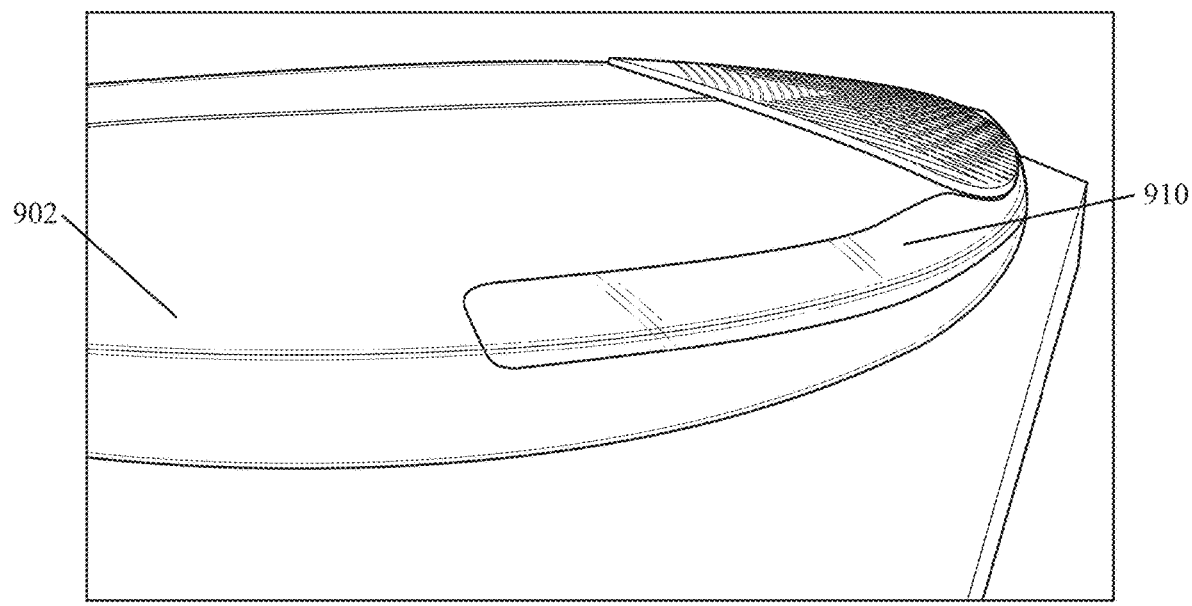

As shown in FIG. 9G, the user may obtain a squeegee or spreader (e.g., a credit card) 945 to aid in the application of the lubricated substrate film grip 910 onto the board. As shown, the user may use the spreader 945 in slow light pressure strokes to begin smoothing out the substrate film grip 910 and pushing out the water and dish soap solution and any air bubbles from under the substrate film grip 910. The user may continue smoothing out the substrate film grip 945 until the film grip 910 is completely flat on the surface of the board 902 and no air bubbles remain under the film grip 910, as shown in FIG. 9H.

Figure 9I:
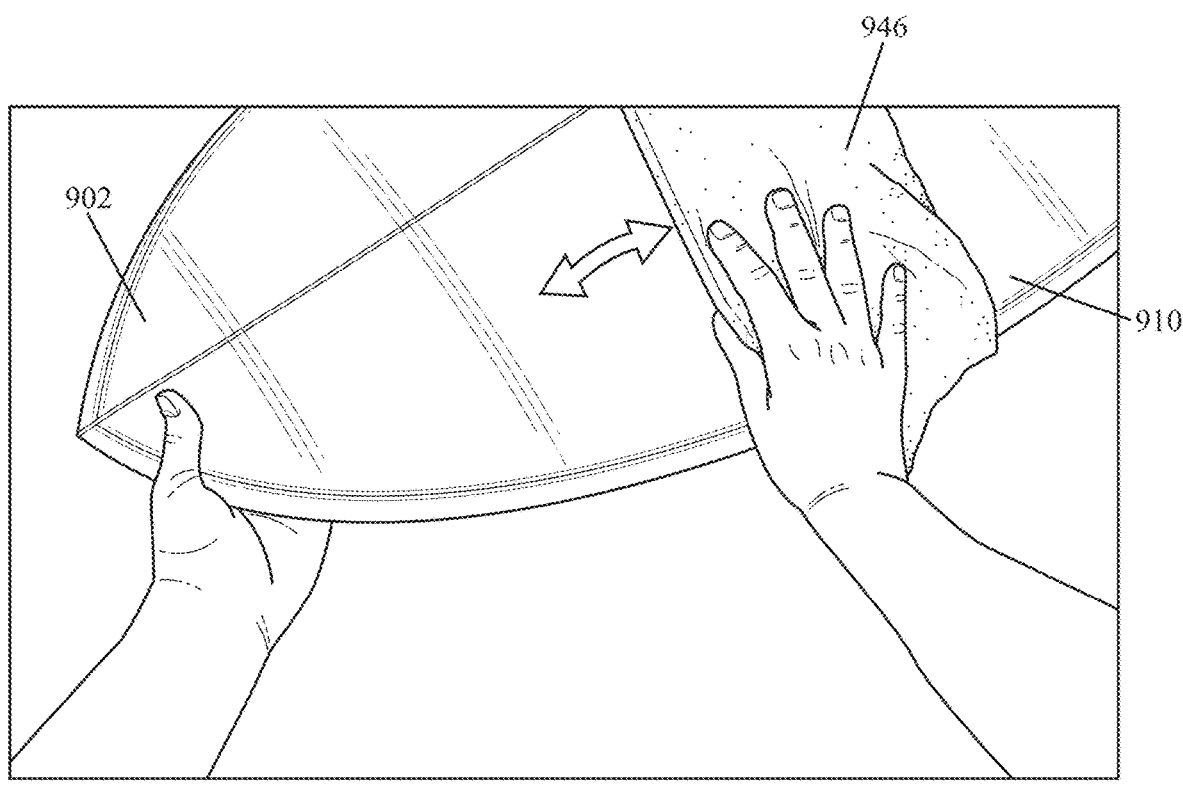

As shown in FIG. 9I, the user may then take a wiping cloth (e.g., paper towel, napkin, hand towel) 946 and begin wiping off any remaining solution from the surface of the substrate film grip 910. Once any excess solution and any remaining air pockets have been wiped from the substrate film grip 910, the user may apply more substrate film grips onto the surface of the board sports board 902 as desired, as an example. Once the user has applied any and all substrate film grips onto the board, the board may be allowed to dry for 24 to 48 hours, as an example. Allowing the substrate film grip and board to dry for this extended period of time may enable the substrate film grip 910 to completely bond to the surface of the board 902. The user may then use the board sports board 902 in any body of water without the substrate film grip 910 peeling off, as an example.

An advantage of the method of applying the adhesive-backed substrate film grip disclosed herein may be the ease with which the film grip is applied onto the board sports board. Another advantage may be that the method may enable the installation of any size, width or length of adhesive-backed substrate film grip onto any flat, semi-flat or semi-complex curved surface that would require traction.

It should be understood that the adhesive-backed substrate film, the adhesive-backed substrate film grips, and methods of tracing and applying the film disclosed herein may be similarly applied to flooring, tile, walkway, steps and/or decking of a boat, or any other surface that could benefit from traction, given the appropriate minor adjustments.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A method of tracing a first lengthwise half of a board sports board onto a substrate film for applying the substrate film to the board sports board, the method comprising the steps of:
   aligning a centerline of a tracing scale with a center of the board sports board, the board sports board having a shape, and the tracing scale further comprising:
      a left side;
      a right side opposite to the left side with respect to the centerline;
      a center area, wherein the center area is positioned between the left side and the right side;
      the centerline being disposed in the middle of the center area;
      an off-center zone disposed in the left side or the right side of the tracing scale; and
      an off centerline disposed in the off-center zone parallelly with the centerline;
   applying adhesive elements to a surface of the board sports board such that to allow temporary adhesion of the substrate film to the board, the substrate film comprising:
      a centerline mark running down a center of the substrate film;
      a top surface and a bottom surface; and
      a transparent release liner, the transparent release liner lining the bottom surface of the substrate film;
   placing the centerline mark of the substrate film within the off-center zone of the tracing scale;
   applying pressure onto the substrate film such that the film temporarily adheres to the adhesive elements;
   flipping the board sports board over such that the board sports board is on the bottom surface of the substrate film;
   generating a trace outline by tracing an outline of the first half of the board sports board onto the substrate film.

2. The method of claim 1 wherein the placing of the centerline mark of the substrate film within the off-center zone of the tracing label is performed by:
   placing the substrate film onto the surface of the board sports board; and aligning the centerline mark of the substrate film with the off centerline in the off-center zone of the left or right side of the tracing label, such that a distance between an edge of the trace outline and the centerline mark of the substrate film is larger or smaller than a distance between an edge of the board and the center of the board.

3. The method of claim 1 further comprising repeating the aligning, applying adhesive elements, placing, applying pressure, and flipping steps of claim 1, and generating a second trace outline by tracing an outline of a second half of the board sports board onto the substrate film.

4. The method of claim 3 further comprising:
generating a substrate film cutout by cutting out the trace outline and the second trace outline on the substrate film; and
removing the tracing scale and adhesive elements from the surface of the board sports board.

5. The method of claim 4 wherein the substrate film cutout is larger or smaller than the outline of the board sports board.

6. The method of claim 4 further comprising:
placing the substrate film cutout onto the surface of the board sports board such that the substrate film cutout is centered on the board, the substrate film cutout further comprising an adhesive, the adhesive being between the substrate film and the release liner;
removing a scored center peel strip from the transparent release liner of the substrate film such that the adhesive is exposed, the release liner further comprising a pair of side peel strips, wherein the center peel strip is positioned between the pair of side peel strips;
applying pressure to the adhesive exposed by the removing of the center peel strip from the release liner, such that a center adhesive area of the substrate film adheres to the surface of the board;
folding over a first lengthwise half of the substrate film cutout along the center adhesive area of the substrate film such that the release liner is on the top surface of the substrate film;
peeling back a first side peel strip of the pair of side peel strips from the release liner such that the adhesive beneath the first side peel strip is exposed;
operating an atomizing spray bottle to spray a solution of water and liquid soap onto the exposed adhesive of the first lengthwise half and the board, such that the adhesive of the substrate film and the surface of the board are wetted;
laying the wetted first lengthwise half of the substrate film cutout onto the wetted surface of the board;
smoothing out the substrate film on the surface of the board with a spreader such that to remove excess solution and air pockets from beneath the film; and
wiping remaining solution from the surface of the substrate film with a wiping cloth.

7. The method of claim 6 further comprising once remaining solution removed, letting the substrate film cutout bond to the board sports board away from sunlight for a period of time between 24 to 48 hours.

* * * * *